Figure 1:
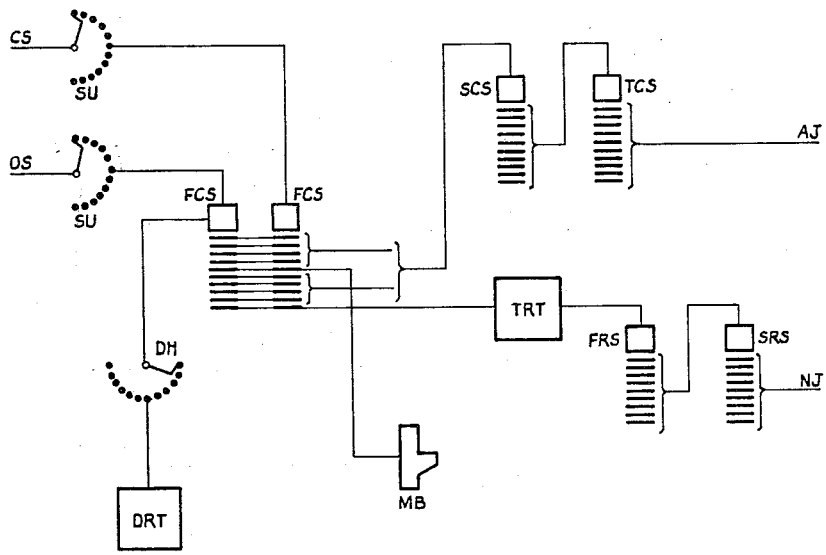

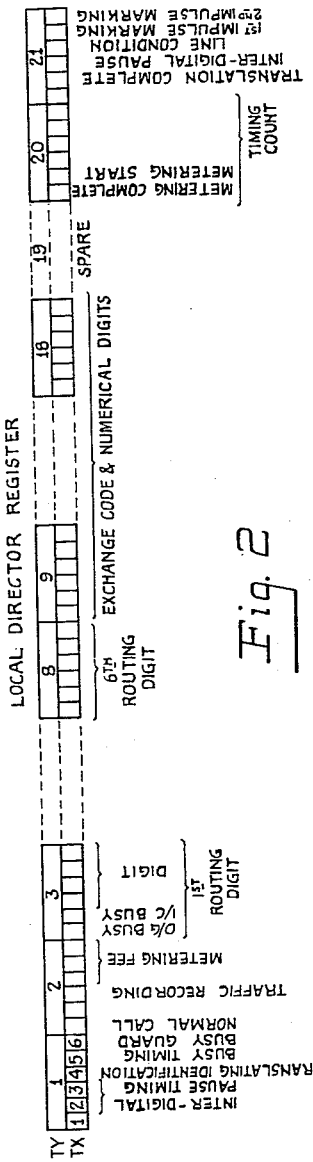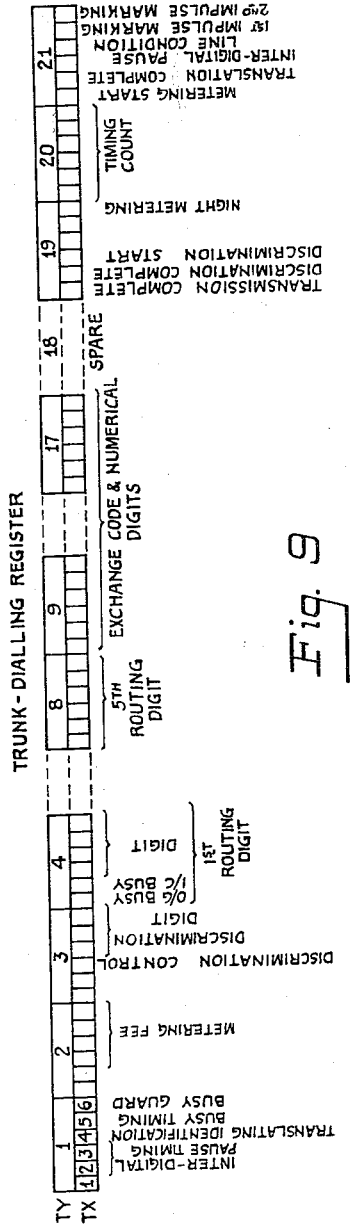

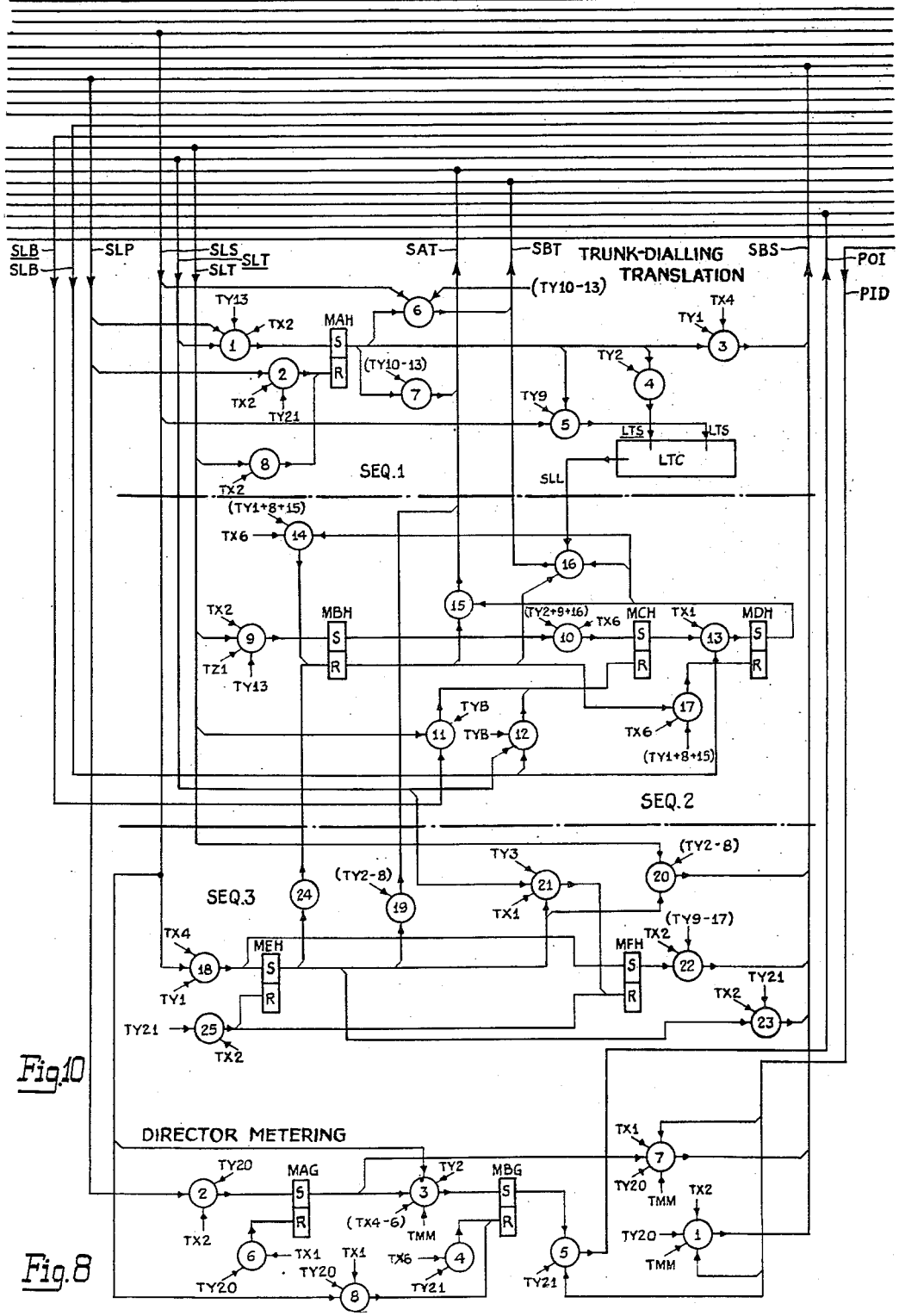

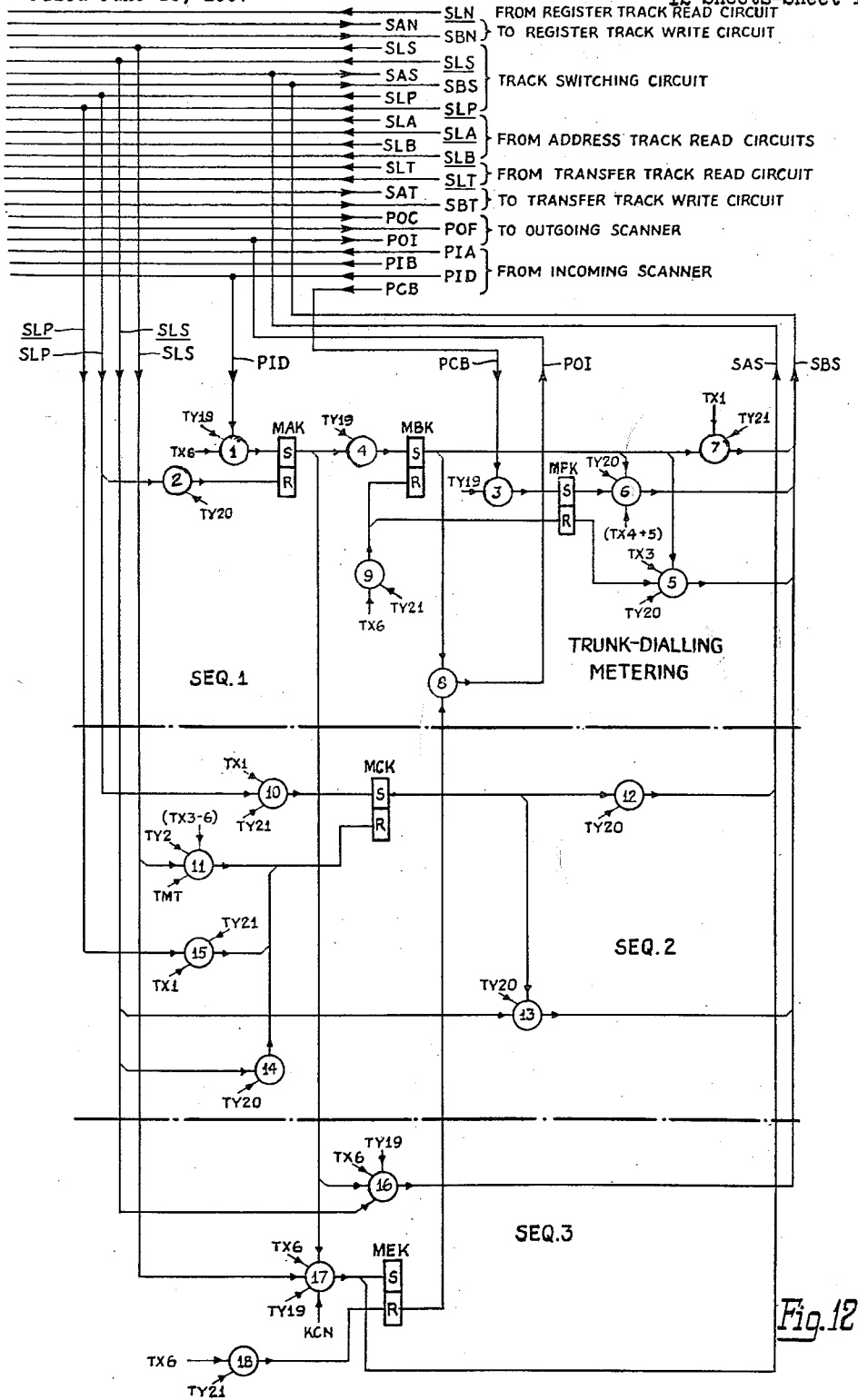

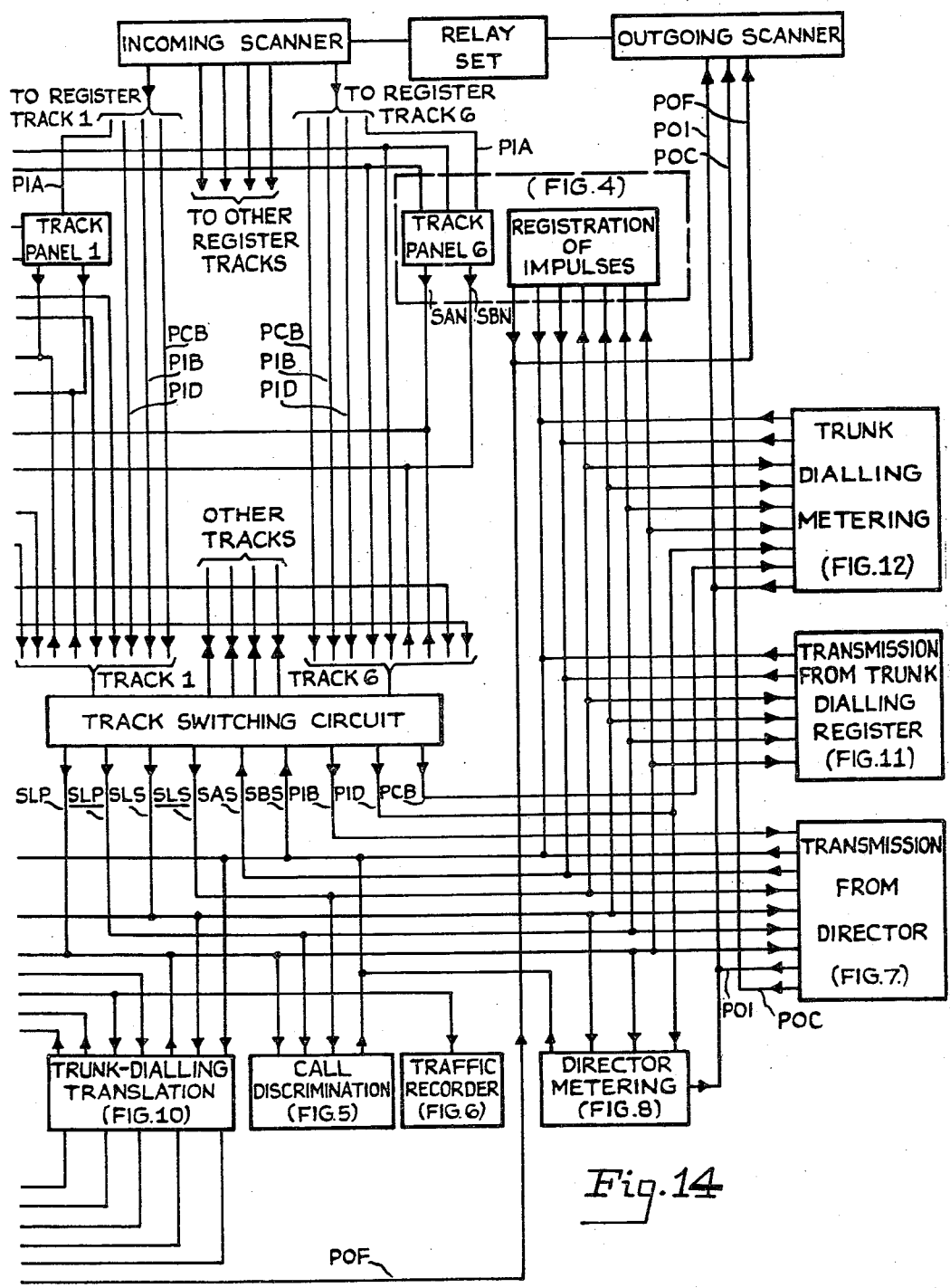

United States Patent Office 3,107,271
Patented Oct. 15, 1963

3,107,271
TELEPHONE SYSTEMS
Kenneth George Marwing, John Frank Greenaway, and Robert Henry Milton, all of Liverpool, England, assignors to Automatic Telephone & Electric Company Limited, Liverpool, England, a British company
Filed June 10, 1957, Ser. No. 664,820
Claims priority, application Great Britain June 27, 1956
7 Claims. (Cl. 179—18)

The present invention relates to automatic telephone systems, and is particularly concerned with systems having exchanges employing register controllers of the code translating type which include magnetic drum or like storage apparatus.

In national dialling networks, it is deirable that a wanted subscriber's directory number should be the same regardless of the exchange from which the call is made. Since, however, a local directory numbering scheme does not provide sufficient digits to distinguish every exchange in a national network, it is necessary to add one or more prefix digits to the directory number when a non-local call is being made, the additional digits being used in routing the call to the correct zone and area. These prefix digits may be omitted when making a local call. One requirement of this type of exchange is that the equipment shall distinguish between local and non-local calls before trunk-dialling equipment is taken into use, and thus uneconomic use of the latter is avoided. At the same time it is desirable that when the facility of trunk dialling is introduced into an existing local network, as little change as possible should be made to existing circuits and equipment. A further desirable feature is that the provision of time and zone metering arrangements required for trunk calls should not interfere with the normal multi-metering arrangements used for local calls. It is also proposed that in national dialling networks, the metering of calls set up by coin box subscribers shall be effected automatically and that the charges for such calls should be higher than those set up by ordinary subscribers.

One of the objects of the invention, therefore, is to provide metering arrangements which enable these features to be carried into effect.

According to the invention, in a telephone system employing register devices of the magnetic drum type for determining the appropriate operation of a calling subscriber's meter dependent on the duration of a call, impulses transmitted to the drum from a timing device effect a counting operation in a storage block on the drum associated with a calling subscriber and the attainment of a predetermined value by the registration in said storage block results in a fee being recorded against the calling subscriber, the arrangement being such that the number of impulses required to attain said predetermined value is less if the calling subscriber is a coin box subscriber than if the calling subscriber is an ordinary subscriber.

According to one aspect of the invention, in a telephone system employing register devices of the magnetic drum type for determining the appropriate operation of a calling subscriber's meter dependent on the duration of a call, impulses transmitted to the drum from a timing device effect a counting operation in a storage block on the drum assoicated with a calling subscriber and the attainment of a predetermined value by the registration in said storage block results in a fee being recorded against the calling subscriber, the arrangement being such that the time taken to attain said predetermined value is less if the calling subscriber is a coin box subscriber than if the calling subscriber is an ordinary subscriber.

According to another aspect of the invention, in a telephone system employing register devices of the magnetic drum type for determining the appropriate operation of a calling subscriber's meter dependent on the duration of a call, on the reply of the called subscriber an initial registration is effected in a storage block on the drum assoicated with the calling subscriber, the registration being different according to whether the calling subscriber is an ordinary or coin box subscriber and impulses are transmitted to the drum during the continuance of the call from a timing device to effect a counting operation in said storage block, the attainment of a predetermined value by the registration in said storage block resulting in a fee being recorded against the calling subscriber, the number of impulses required to attain said predetermined value being less if the calling subscriber is a coin box subscriber than if the calling subscriber is an ordinary subscriber due to the difference in the initial registration.

According to a further aspect of the invention, in a telephone system employing register devices of the magnetic drum type for determining the appropriate operation of a calling subscriber's meter dependent on the duration of a call on the reply of the called subscriber one or other of two numbers according to whether the calling subscriber is an ordinary or coin box subscriber respectively is registered in a storage block on the drum assoicated with a calling subscriber, the ratio of the first to the second number being the same as the ratio of the frequencies at which a fee is recorded against ordinary and coin box subscribers respectively and impulses are transmitted to the drum during the continuance of the call from a timing device to increase the number already registered, a fee being recorded against the calling subscriber when the number registered attains a predetermined value.

The invention will be better understood from the following description of an embodiment in which a director exchange employing a magnetic drum to provide register-translator facilities is provided with additional equipment, which may use the same or a separate magnetic drum, to route non-local calls over the national network. The description should be read in conjunction with the accompanying drawings, comprising FIGS. 1 to 14.

Figure 3:
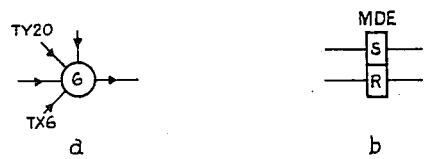
Figure 4:
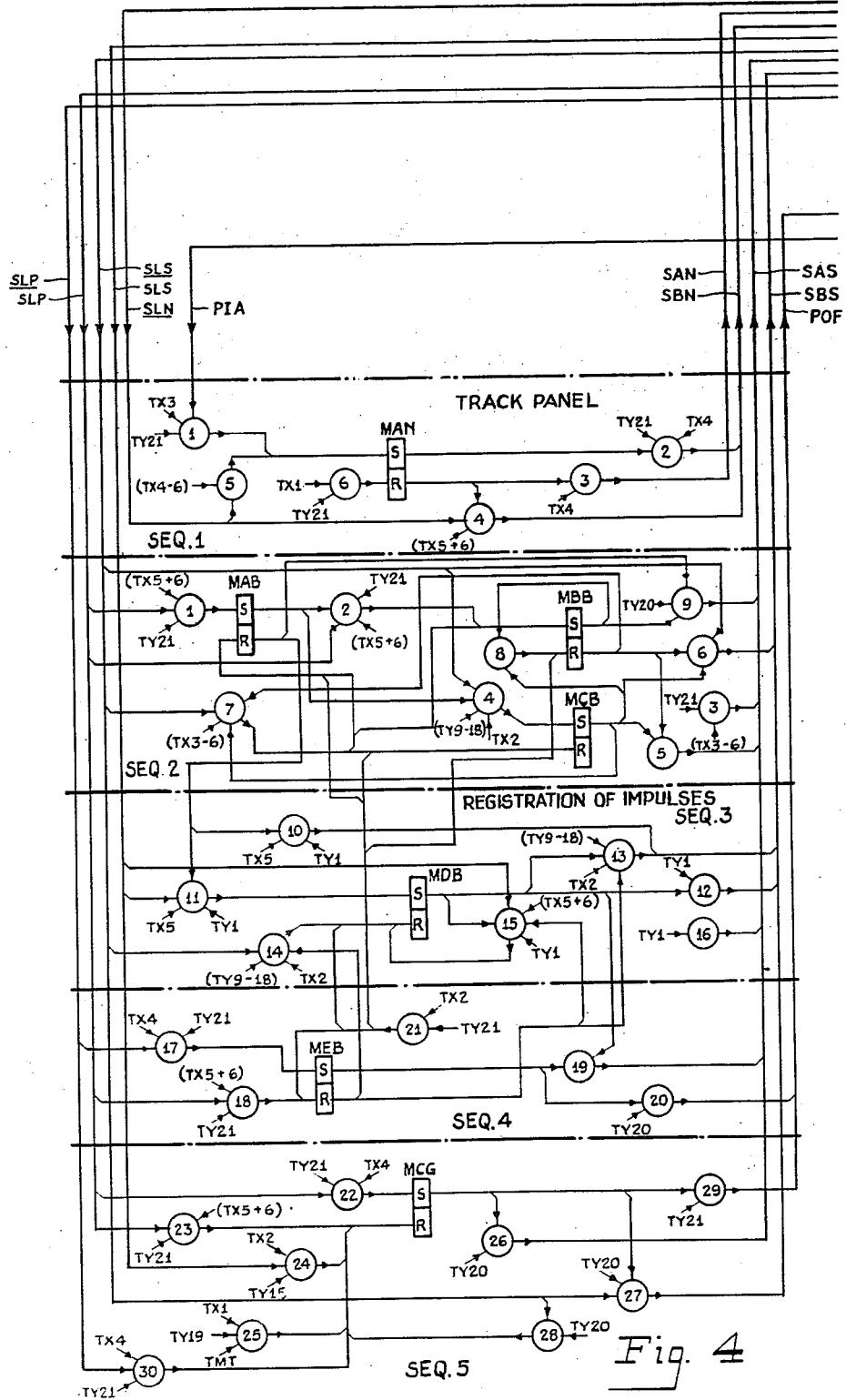
Figure 5:
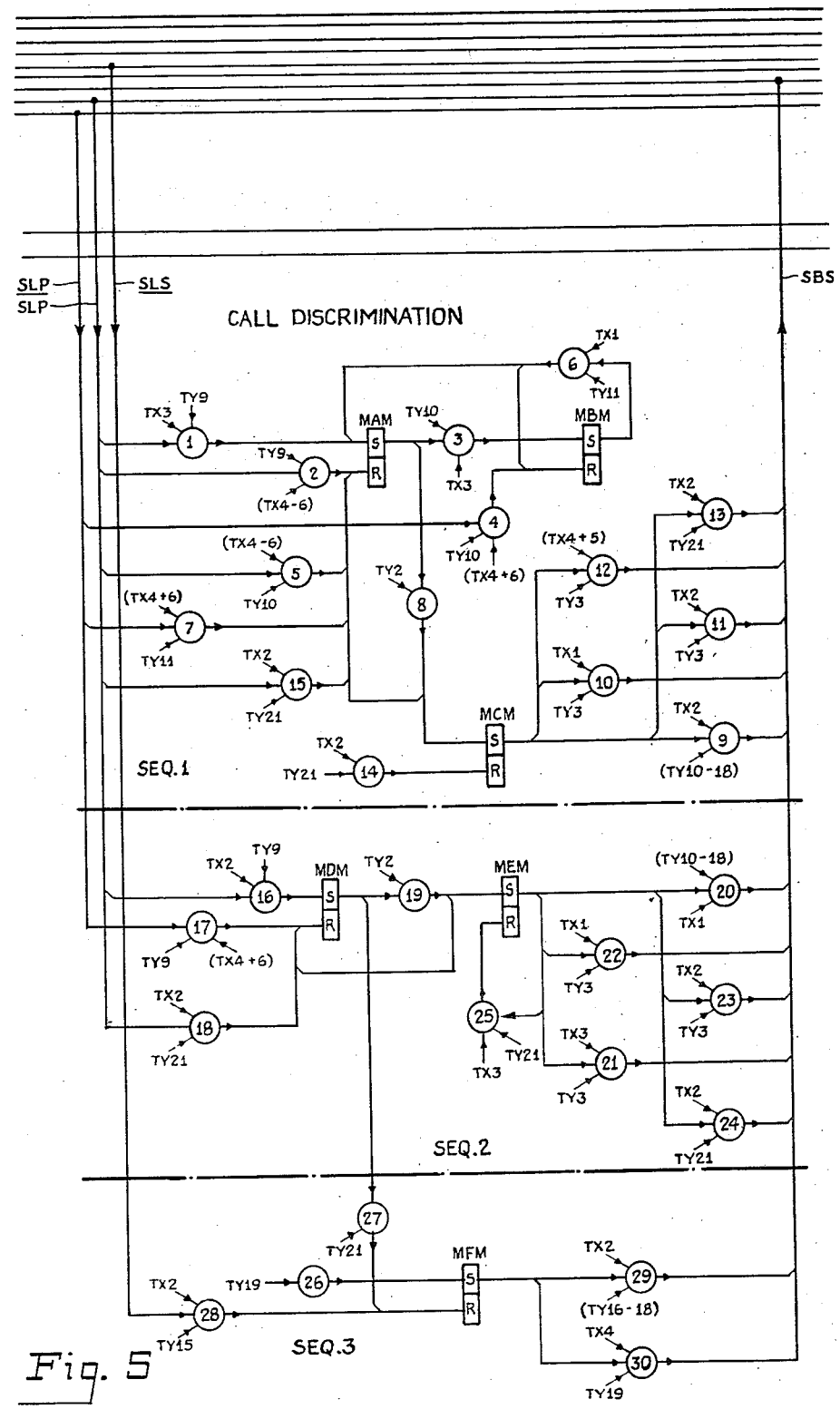
Figure 6:
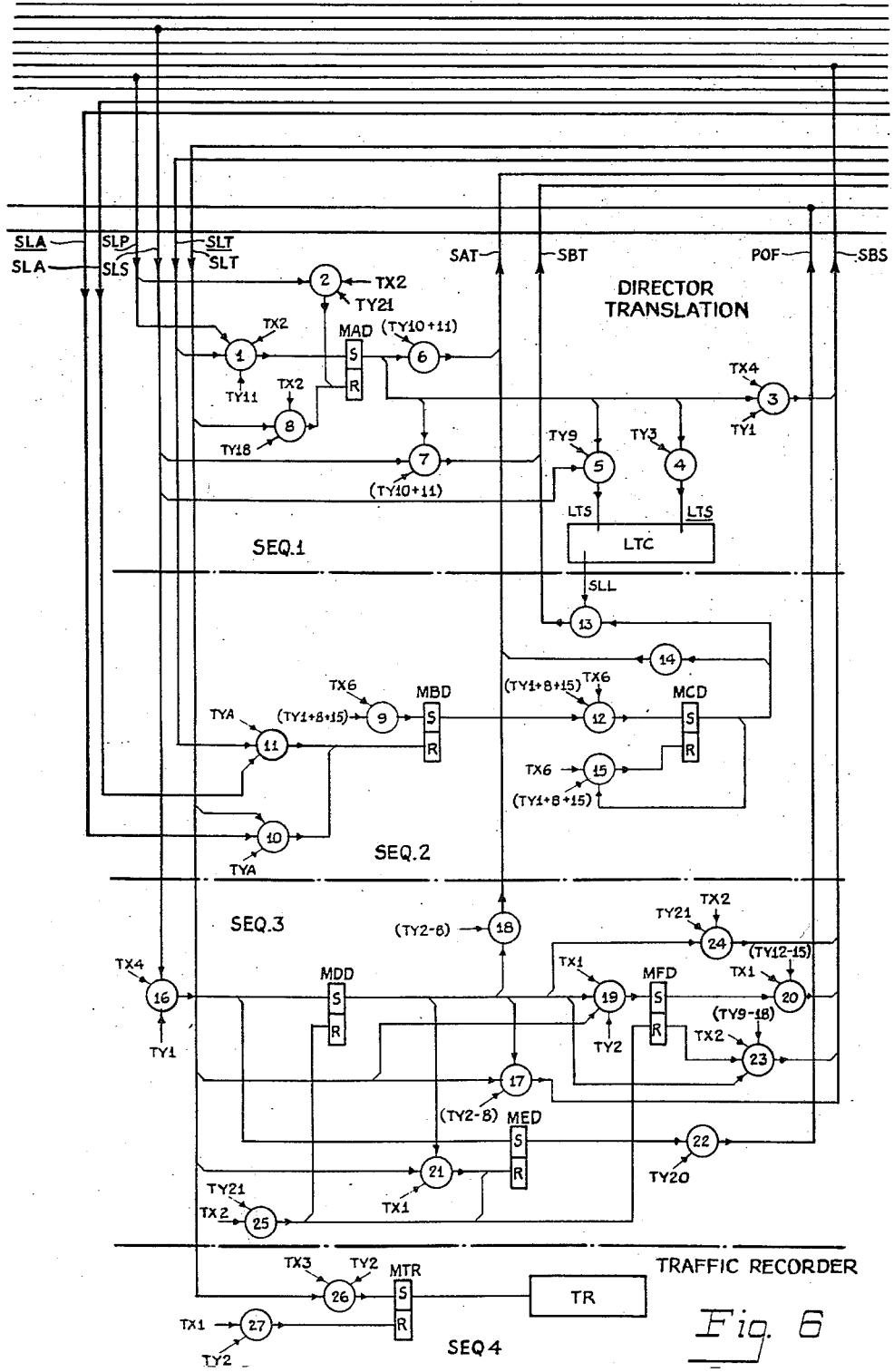
Figure 7:
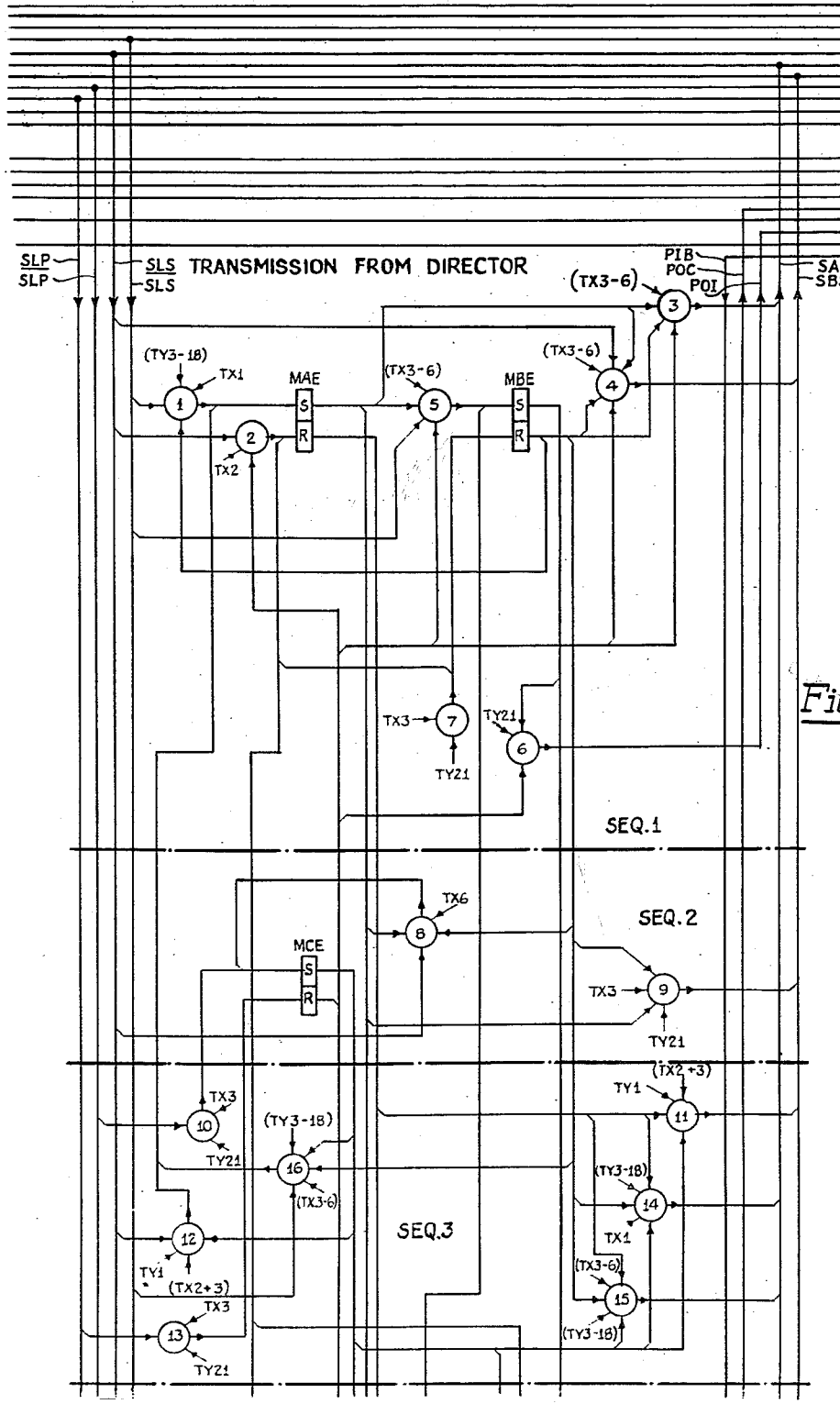
Figure 7A:
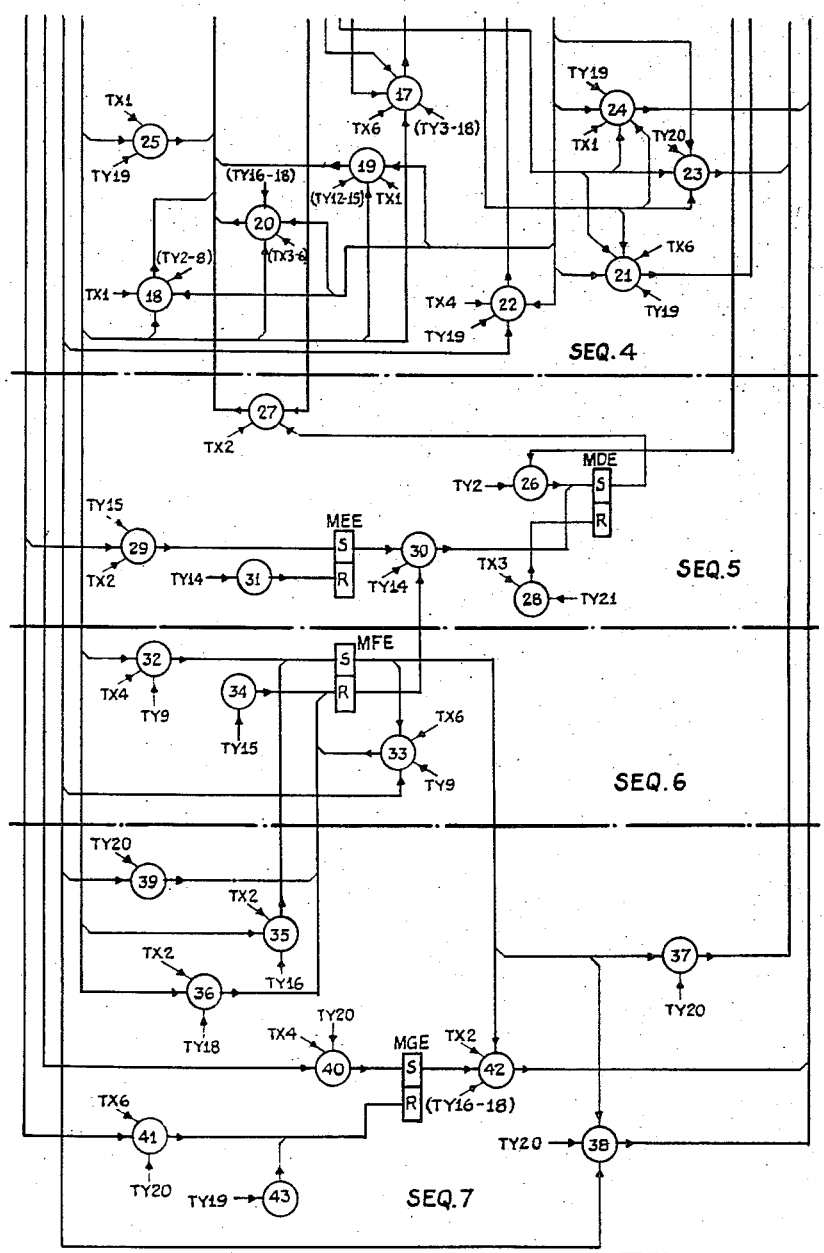
Figure 11:
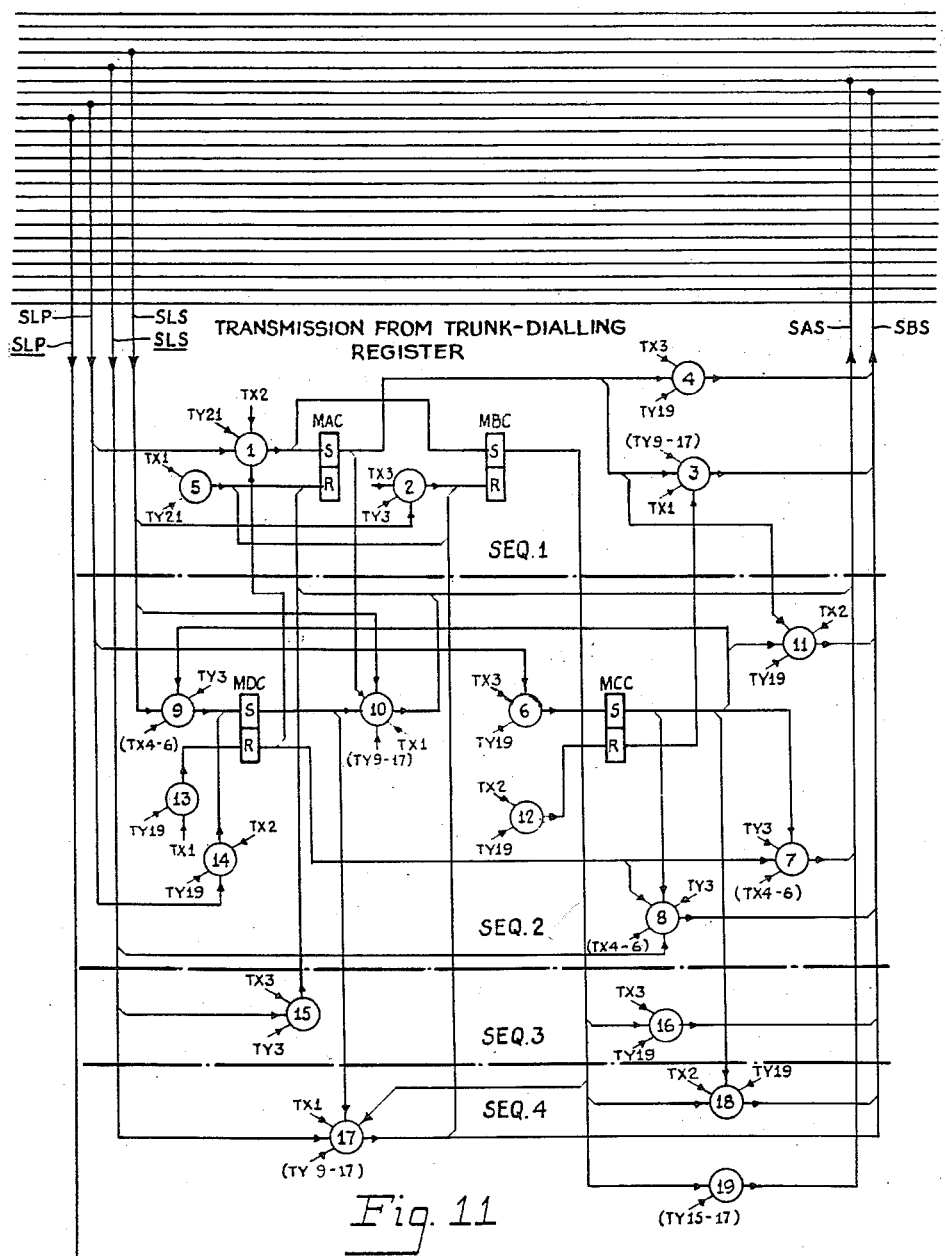
Figure 11A:
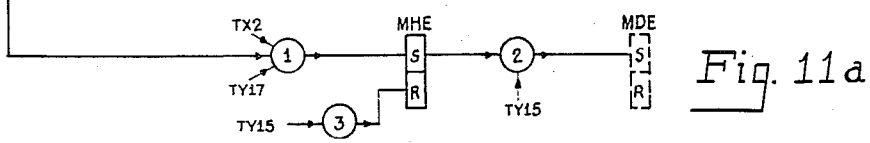
Figure 13:
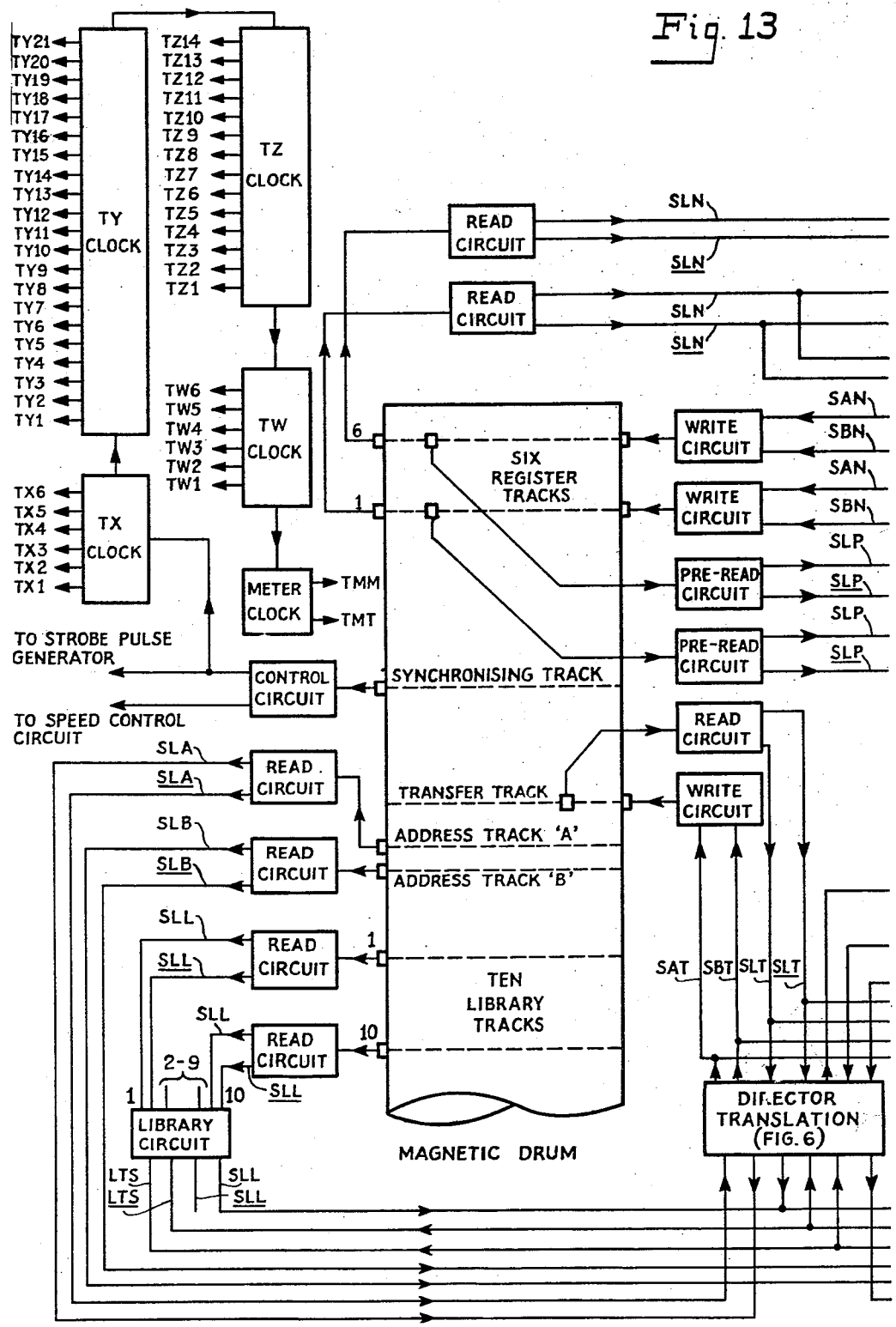

Of the drawings,

FIG. 1 shows a trunking arrangement of the director exchange to be described,

FIG. 2 shows the details of a register track of a magnetic drum employed as a local director, FIG. 3 shows the symbols employed in the circuit drawings, FIG. 4 shows the circuit employed in the registration of dialled impulses, FIG. 5 shows the circuit used in discriminating between different types of call, FIG. 6 shows the circuit employed in the translation of a local director code, FIGS. 7 and 7a when arranged with FIG. 7 above FIG. 7a show the circuit employed in the transmission of digits from a director register, FIG. 8 shows the metering circuits used in a director call, FIG. 9 shows the details of a register track of a magnetic drum employed in trunk-dialling, FIG. 10 shows the circuit employed in translating a trunk-dialling code, FIGS. 11 and 11a show the circuits employed in the transmission of digits from a trunk-dialling register, FIG. 12 shows the metering circuit arrangements for a trunk-dialling call and FIGS. 13 and 14 when arranged side by side with FIG. 13 on the left show diagrammatically the association of the reading and writing heads of the magnetic drum with the individual and common equipment.

The invention will first be described briefly with reference to the trunking diagram of FIG. 1, which shows the switching arrangement in a director exchange. Ordinary subscribers' lines OS and coin box subscribers' lines CS have access to 1st code selectors FCS via their respective uniselectors SU. When a subscriber initiates a call, his uniselector hunts for and seizes a free 1st code selector, whereupon the director hunter DH permanently associated with this switch hunts for a free director, DRT. The director comprises a register-translator arrangement employing a magnetic drum, which provides a common translator and a large number of registers, each of which is associated with an individual and external relay set. The director hunter gains access to a register of the director via its associated relay set, which repeats all digits dialled by the subscriber. The scanning arrangement between the drum and the relay sets samples the relay sets in turn at high speed, and transfers the repeated impulses to the corresponding registers. When the subscriber has dialled sufficient code digit to identify the destination of the call, the register in use refers to the translation section of the drum which transfers one or more routing digits to the register, and the latter transmits these digits via the 1st code selector and, if necessary, subsequent selectors, to set up the required connection.

When the subscriber wishes to make a call within the local director area, he dials the A, B and C digits, which are registered in an idle register, and after translation, the appropriate routing digits are transmitter via the associated relay set and the director hunter in use to set up the call via the 1st code selector FCS, 2nd and 3rd code selectors SCS and TCS, and subsequent selectors if necessary, to the local exchange junctions AJ. When the call is for an exchange outside the director area, trunk-dialling equipment is taken into use by means of the prefix digit "0" dialled by the subscriber. When the director DRT detects the initial digit "0" stored in the register taken into use by the subscriber, a translation digit "1" is immediately written into the register, which prepares to receive and re-transmit an increased number of dialled digits. The translation "1" steps the 1st code selector to level-1, and the switch thereupon hunts for a free register in a trunk-dialling register-translator TRT. This equipment is similar to the director DRT in that it employs a magnetic drum providing a common translator and a large number of registers, each of the latter being permanently associated with an individual and external relay set. The director gains access over level-1 of the 1st code selector to a free trunk-dialling register via its associated relay set, which receives digits re-transmitted by the director.

The trunk-dialling register-translator operates in a similar fashion on the director, providing a translation of the code digits received, and routing the call via the 1st and 2nd routing selectors FRS and SRS, and subsequent selectors if required, and an idle outgoing junction NJ, over which the remaining translated digits, the exchange code digits if required, and numerical digits, are transmitted to set up the connection.

When the subscriber wishes to use the services of an operator the digits "100" are dialled into the director, which provides a routing digit ("6" in the embodiment shown), and this is used to step the 1st code selector to the appropriate level for connection of the calling subscriber to a manual board MB.

In the case of a call to an exchange within the director area, metering is on a multi-fee basis in accordance with a code which is supplied to the register by the translation equipment of the director at the same time as the routing digits. The subscriber's meter is operated the appropriate number of times by signals supplied by the register when the called subscriber answers. In the case of a dialled trunk call, metering is effected on a time and distance basis, the subscriber's meter being operated at intervals throughout the call at a rate dependent upon the distance from the terminating exchange. This is again controlled by a code returned to the trunk-dialling register by the translator portion of the trunk-dialling register-translator together with the translation of the dialled code digits.

The magnetic drums referred to are of the type described in continuation-in-part application Serial No. 778,147 to G. T. Baker in which the method of storing information in binary form by reversals of magnetization is also described. Further the translating arrangements to be later described follow closely the principles described in continuation-in-part application Serial No. 635,708 to G. T. Baker. In particular, the translation arrangements described in application Serial No. 635,708 involved the use of library tracks on which are stored permanent information and the use of address and transfer tracks by which the appropriate part of the permanent information on a selected library track is transferred to a register track.

In the embodiment of the invention to be described and shown diagrammatically in FIGS. 13 and 14, each drum includes six register tracks each divided into 14 sections, 13 of which are employed as registers. There are ten library tracks, containing routing and metering codes permanently stored in blocks corresponding to similarly positioned blocks on an address track, each of the address blocks having permanently stored in it part of an exchange code. The routing and metering information stored in the library track refers to the exchange code of which part is contained in the corresponding position of the address track. A further track known as the transfer track is provided, upon which dialled codes extracted from a register are circulated until a position corresponding to an address containing part of the dialled code is reached, when the appropriate routing code read from the corresponding section of a selected library track is substituted for dialled code on the transfer track, the routing code then being circulated on this track until a position corresponding to the originating register is reached, when transfer of the code to that register is effected.

Access to particular storage areas is obtained by means of a system of square-wave clock pulses, provided by a pulse generator driven from a specially marked synchronising track on the drum, and therefore synchronised with it. The signals picked up by the synchronising track reading head are passed through a control circuit, one output from which is employed to drive the TW, TZ, TY and TX clocks shown in FIG. 13. A second output from the control circuit drives a strobe pulse generator (not shown) the output from which is employed for a purpose to be described later. A third output from the control circuit is employed to maintain constant the speed of rotation of the drum. The duration of pulses is based upon the revolution period of the drum, and the pulses are related as follows:

TW pulses have a duration equal to the time taken for the drum to make one electrical revolution. How this differs from the mechanical revolution will be explained subsequently. There are 6 TW pulses in a series since there are 6 register tracks on the drum.

TZ pulses are synchronised with TW pulses, and 14 TZ pulses have the same duration as one TW pulse.

TY pulses are similarly related to TZ pulses, 21 TY pulses having the same duration as one TZ pulse.

TX pulses are so related to TY pulses that six TX pulses occur during one TY pulse.

All the pulses in a series are contiguous, and the commencement of a pulse of any series coincides with the commencement of a pulse in the series of next higher frequency.

The duration of a single TX pulse is used to define the length of track to be occupied by a single storage element containing one binary digit, this length of track passing completely under a read or write head during one TX pulse. TY pulses are used to define the length of track occupied by a block of six elemental areas and when such a block is used as a digit store, a digit representing nought to ten in binary form, together with two controlling binary digits, may be stored therein. Other uses are made of certain of these blocks in controlling and manipulating digital information. TZ pulses define the length of track occupied by a register which contains 21 storage blocks TY, and TW pulses are used to define the length of track occupied by all the registers on a single track, which is, in fact, half the length of the track.

The pulses in each series are distributed over a set of leads in a recurring cycle, there being six TW leads, 14 TZ leads, 21 TY leads and six TX leads. By combining a lead from each of these series in an "and" type of coincidence circuit, it is possible to obtain a single output pulse of duration equal to a TX pulse, at any required point in the complete cycle of TW pulses. Since the pulse cycle is synchronised with the rotation of the drum and commences as a particular slot on the drum passes under a reading head, such coincidence circuits may be used to define the passage of a particular elemental area or slot under a reading or writing head. It is therefore convenient to designate each storage position on a track by the timing pulse occurring as that particular position is scanned, e.g.

TX2.TY21.TZ5

It is sometimes necessary for a timing pulse to continue for more than one TX period, and combined timing leads may conveniently be used to reduce the number of coincidence circuits required. Where a timing lead has an output covering more than one timing period, a "+" sign is used, e.g.

(TX5+6)

The coincidence circuits are represented in the drawings by symbols of which a in FIG. 3 is typical. The timing pulse leads TX6 and TY20 comprise two of the inputs to the circuit, and the other two inputs may be, for example, connected to the output circuits of two relays or of reading heads. The arrows indicate the direction of the signal between circuit elements.

Pulses from these coincidence circuits may be used to operate electronic relays, which are of the bistable type and in the set condition give an operative output on one output lead, and in the re-set condition give an operative output on a second output lead. The relays may also be operated by other similar relays.

The symbol for a relay used in the drawings is shown by the example at b in FIG. 3. The "set" and "re-set" halves of the relay are referenced "S" and "R" respectively. In each case, it is assumed that the input signals to a relay come from the left hand side, while the output signals are taken from the right hand side of the relay. The outputs of relays and of coincidence circuits are also used to record information on the tracks of the drum, and for this purpose so-called "A" and "B" leads are employed. A "write" signal applied to an "A" lead results in a magnetic marking representing "0" being written or re-written on a track, and a "write" signal applied to a B lead results in a magnetic marking representing "1" being written or rewritten on the track. If "write" signals are applied to both leads simultaneously, the effect of the B lead predominates, and a 1 is written on the track.

In order to make the writing and switching operations definite, very short strobe pulses previously referred to are employed, which occur at a point towards the end of each TX pulse. The strobe pulses are ineffective on their own, but when they coincide with a relay-operating pulse or a writing pulse, the two pulses together effect the circuit operation. It was mentioned that a relay has two output conditions, dependent on the set or re-set condition of the relay. These may be indicated when describing circuit operations in symbolic form by using the relay designation alone to refer to the set condition, e.g. MAB, and by using the relay designation underlined to refer to the re-set condition, e.g. MAB. Thus a circuit operation in which a relay MBK is re-set when the last storage element of a register has passed the read head may be written:

TX6.TY21—MBK showing that in the time period represented by TX6.TY21, a signal is applied to relay MBK to re-set it, whether it was previously set or not. If this relay is to be set during another part of the register scan, but only if a second relay MAK is already in the set condition, the circuit operation may be written:

MAK.TX6.TY19—MBK

This circuit, of course, would be inoperative if relay MAK were in the reset condition, and at any other instant than during the passage of element TX6.TY19 under the read head. It should be noted that this operation is not dependent upon the signal stored in element TX6.TY19 of the register.

The various tracks have characteristic letters allotted to them as follows:

Register tracks_____ S
Transfer track_____ T
Address track_____ A
Library track_____ L Signals appearing on signal leads connected to the read and write heads are referenced by using a three-letter combination, the first letter being "S," and the last either the track reference letter or the letter S which indicates that the leads extend from common equipments and can be switched to the heads of the six register tracks. In the case of write heads, the second letter is "A" when a 0 is to be written on the track and "B" when a 1 is to be written in accordance with the "A" and "B" signals mentioned previously. A signal read from the track has "L" for its second letter, and the difference between a 1 and a 0 is indicated by underlining the combination in the case of a 0 signal. By way of example, the circuit written

MAB.SLS.TX5.TY1—MDB indicates that if relay MAB is in the re-set condition, and a 1 signal is read at any of the 14 storage positions TX5.TY1 of the register track being scanned, a signal is applied to relay MDB to set it.

It was mentioned earlier that each register has a relay set permanently allotted to it, and the relay sets are associated in turn with the drum in a continuous scanning operation by the incoming scanner. The principles of operation of the incoming scanner are described in continuation-in-part application Serial No. 641,998 to G. T. Baker et al. and these principles also apply to the outgoing scanner and to the scanning arrangements between common equipment and the register tracks. The register tracks are continuously in use for scanning purposes, so that a register is associated with its relay set for the transfer of information once in each electrical revolution of the drum. The speed of rotation of the drum of the embodiment of the invention being described is 1800 revolutions per minute, and a revolution therefore takes 33⅓ milliseconds (ms.). It is convenient to use only half the circumference of the drum for a register track, the reading and writing heads being spaced 180° apart. This gives the advantage of effectively superimposing the reading and writing heads on these tracks, and although half of the track is short-circuited, it is considered that the loss of storage space is compensated by advantages gained. It will thus be seen that a register is examined by its track circuit twice in each mechanical revolution of the drum, i.e. at intervals of 16⅔ ms., and the electrical speed is therefore twice the mechanical speed as far as scanning the relay sets is concerned. Since a relay set is sampled each 16⅔ ms., any change of condition in the relay set due to dialling will be recorded by the register, if the dialling speed does not greatly exceed the normal ten impulses per second. It will be understood that since each register track has to be scanned during each revolution of the drum and since there are six register tracks, the incoming scanner will include six continuously operating scanning circuits, one for each register track.

With regard to the outgoing scanner which serves to associate the registers in turn with the appropriate relay sets for the purpose of impulse transmission, this operates at a slower speed than the incoming scanner. The reason for this is that impulse transmission takes place at the rate of 10 i.p.s. so that scaning for impulse transmission need not take place more than 10 times per second whereas scanning the line circuits for registration takes place 60 times per second, partly in order to take account of impulse distortion. Further once the registration has been made in the registers, it is unnecessary to examine the registration more frequently than 10 times per second. Consequently the arrangements for examining the registrations can be common to all the register tracks, and switching means of the type described in Patent No. 2,854,655 to Beaufoy et al. are provided to associate the register tracks in turn with the common equipment.

The allocation of storage areas within a section of track used as a register will be seen from FIG. 2. From this drawing it will be seen that the dialled digits are allotted the storage blocks TY9–18. In the case of a local call, the exchange code digits A, B and C are stored in blocks TY9–11 respectively, and the four numerical digits are stored in blocks TY12–15. For a call taking the trunk-dialling equipment into use, the number of digits dialled is variable. The trunk-dialling prefix digit is stored in block TY9, and the remaining digits are stored in blocks TY10–18, or in as many of these as are required. The routing digits, obtained by translation of the exchange code digits or of the trunk-dialling digits, are stored in blocks TY3–8, or in as many of these as are required.

It will be seen by reference to block TY3 that in each digit storage block TY3–18, storage elements TX3–6 are used to register the digit in binary form, element TX3 being the lowest order element ($2^0$) and TX6 being the highest order element ($2^3$) in each case. In these blocks, elements TX1 are referenced "o/g busy," i.e. "outgoing busy," and the marking in one of these elements determines whether or not a digit stored in that particular storage block is to be transmitted from the register. The corresponding elements TX2 are referenced "i/c busy," i.e. "incoming busy," the marking in one of these elements determining whether that particular storage block has a digit stored in it, or if no digit or an incomplete digit is stored in it.

The remaining elements of the register section are allotted as follows. In block TY1, elements TX2 and TX3 are used in timing an inter-digital pause during transmission of digits from the register, element TX4 is used to identify a register whose stored code digits are being translated, and elements TX5 and TX6 are used to detect an inter-digital pause when dialled impulses are being received. The markings in block TY2 are supplied by the translation part of the drum together with the routing digits. The marking in element TX1 indicates whether the call is normal, or if a false code or a "code only" code has been dialled, element TX2 is used where a record of traffic over a particular junction is being kept, and elements TX4–6 are used for storing a digit indicative of the appropriate fee for the connection.

Block TY20 is used in various timing processes, for example in timing metering pulses, in timing the forced release period and in timing the period during which further dialled impulses may be expected when determining the end of dialling in a trunk-dialling call. In block TY21, element TX2 is used to store a marking indicating that translation has been completed for the register, element TX3 is used in detecting the open or closed loop condition of the subscriber's line, element TX4 is used in storing an indication of this condition, and elements TX5 and TX6 are used in temporarily registering the receipt of a dialled impulse.

The elements not mentioned, i.e. elements TX1.TY1, TX2.TY2 and TX1.TY21 in each register are not used, and block TY19 is also unused in the present circuits. Of the 14 register sections on a track, only thirteen are employed as registers. Section TZ1 is not used, for reasons which will appear presently.

*General Description*

Referring to FIGS. 13 and 14, reference has already been made to the clock system, the incoming scanner, the outgoing scanner and the track switching circuit. The track panel is individual to a register track while the registration circuit is common to all track panels and is connected to each track panel in turn by the track switching circuit. The track switching circuit is also employed for associating the other common equipment in turn with the register tracks, such common equipment consisting of the translation circuit, the call discrimination circuit, the impulse transmitting circuit, the digit selection circuit and the metering circuit. The outgoing panel is merely a combining circuit for combining the outputs of the impulse transmission circuit and the metering circuit on to a single lead extending to the outgoing scanner.

The pre-read circuit shown in FIG. 13 is a switching circuit similar to the track switching circuit and serves to associate the pre-read heads of the register tracks in turn with the common equipment. A pre-read head is positioned at a distance corresponding in track length to one register section in advance of the normal reading head to enable information stored in a register to be read before that register passes the write head.

The library circuit includes a selecting arrangement which selects one of the ten library tracks in accordance with the first exchange code digit registered on a register track as described in continuation-in-part application Serial No. 635,708 to G. T. Baker. A particular translation from the selected library track is then selected in accordance with the second and third exchange code digits and is transferred to the appropriate register by means of the transfer track.

In the description which follows, each of the various functions of the equipment will be described as a series of sequences, and the drawings are arranged so that the sequences in one function appear in succession from top to bottom of the drawing, while the information read from and written on to the drum is shown, in general, as passing from left to right in each sequence. The sequences are referenced SEQ.1, SEQ.2 and so on in the drawings, and the various coincidence circuits are numbered 1, 2, 3 and so on, in the order in which they become effective, and these numbers are also shown in the description against the written form of the coincidence circuit.

*Registration of Dialled Impulses and Release of Relay Set*

Scanning equipment is provided individual to a register track which enables an impulsing lead from each relay set associated with a register on that track to be connected to the writing head of that track once in every electrical revolution of the drum. Dialled impulses producing signals on the impulsing lead are detected by the register track circuit, and corresponding markings are allotted to a temporary storage position in the appropriate register. The impulse markings are then transferred to their appropriate digit storage positions, but as this involves the use of equipment common to all the register tracks, the transfer is effected on each track in turn. The temporary storage positions are, in fact, examined on every third revolution of the drum, i.e. once in every 100 ms.

Considering the detection and storage of dialled impulses in more detail, reference will be made to FIG. 4.

*Sequence 1 (track circuits).*—Sampling signal lead from relay set via scanning circuit, detection of dialled impulse and storage of impulse in temporary store.

An output signal PIA is obtained from the impulsing lead of the relay set RS by way of the scanning circuit SC when the subscriber's line is looped, and this lead is sampled during the scan of the element TX3.TY21. The signal lead PIA is combined with the coincidence circuit TX3.TY21 to set a relay MAN when the scan detects the looped line. This circuit may be written:

$$\text{PIA.TX3.TY21—MAN} \quad (1)$$

The element TX4.TY21 of a register is used to record the condition of the subscriber's line, and when relay MAN is set, its output signal is used to record its condition in this element. Designating the particular register track under consideration by the suffix letter N, the operation of writing a 1 in the "line condition" element TX4.TY21 may be represented by:

$$\text{MAN.TX4.TY21—SBN} \quad (2)$$

If the subscriber's loop is open, either because dialling is taking place, or because the subscriber has replaced his handset, relay MAN will not be set during the scan of element TX3.TY21. In this case, the second output $\overline{\text{MAN}}$ is taken from the relay in its re-set condition, and is used to record a 0 in the line condition element by means of the circuit:

$$\overline{\text{MAN}}.\text{TX4.TY21—SAN}$$

It will be seen later that relay MAN is normally in the set condition during the scan of the track section TY1–20, and hence the limitation represented by the signal TY21 is superfluous. The latter circuit may therefore be simplified to:

$$\overline{\text{MAN}}.\text{TX4—SAN} \quad (3)$$

The commencement of a dialled impulse is recognised as a change in the condition of the subscriber's line from loop closed to loop open. If during a scan it is found that relay MAN is in its re-set condition during the period represented by TX4.TY21, it is assumed that a dialled impulse is being received, and the output of relay MAN in this condition is used to register a marking representing the impulse in one of the storage positions TX5 or TX6 of block TY21. Of these, element TX5 is normally used, but if the dialled impulses are being received at a speed considerably in excess of ten impulses per second, it is possible that a second impulse may be received before the first has been transferred to its appropriate digit storage position by the common equipment. In this event the second impulse is stored in element TX6. It will be seen, therefore, that before a received impulse is registered, it is necessary to detect whether element TX5 is already occupied or not, and a signal from the reading head as it scans elements TX5 and TX6 is used to ensure that an impulse is stored in the first unmarked element of the two, i.e. the first one in which a 0 is stored. The circuit used is:

$$\overline{\text{MAN}}.\overline{\text{SLN}}.(\text{TX5+6})\text{—SBN} \quad (4)$$

If during the scan of either of these two elements a 0 is read while relay MAN is in its re-set condition, lead SBN is energised to write a 1 in that position. If the digit is to be stored in element TX5, it is necessary to ensure that a 1 is not written in element TX6 as well, and this is provided for by using the signal SLN, which occurs when the 0 stored in element TX5 is read, to set relay MAN, so that the last-mentioned coincidence circuit is ineffective when element TX6.TY21 is being scanned. The circuit used to set relay MAN is:

$$\overline{\text{SLN}}.(\text{TX4–6})\text{—MAN} \quad (5)$$

It will be seen that element TX4 has been included as an additional period during which a 0 encountered by the reading head will cause relay MAN to be set. The reason for this is that if two successive scans of a relay set detect a loop open condition on the impulsing lead, relay MAN would be reset on both scans, and it must be ensured that the same impulse is not registered twice. On the second scan the 0 previously written in element TX4 by the circuit:

$$\overline{\text{MAN}}.\text{TX4—SAN} \quad (3)$$

would be encountered, and the coincidence $\overline{\text{SLN}}.\text{TX4}$ is included in the circuit for setting relay MAN to prevent a spurious impulse being registered in element TX5 or TX6 which would take place if relay MAN were allowed to remain re-set during the scan of those elements.

It was mentioned earlier that relay MAN is normally in the set condition during the scan of the track section TY1–20, and it will now be apparent that the circuit just referred to will produce this effect, since there will always be a 0 in at least one of the elements TX4–6 of block TY21 to set relay MAN. Relay MAN is re-set at the beginning of the scan of block TY21 in each register ready for use in detecting a possible looped line condition during the scan of element TX3. The circuit is:

$$\text{TX1.TY21—}\overline{\text{MAN}} \quad (6)$$

*Sequence 2 (common circuits).*—Adding temporarily stored impulses to appropriate storage block, cancel temporary storage markings, cancel inter-digital pause timing markings, clear timing count block.

The coincidence circuits used in this and the following sequences in the registration of dialled digits are again numbered from 1, because this equipment is distinct from the track circuit equipment just described.

Common equipment examines the temporary storage elements TX5+6 of block TY21 in each register section on all six register tracks in turn, and transfers the digits stored therein to the appropriate one of the digit storage blocks TY9–18 in that register. The common equipment is also employed to detect the end of an impulse train being dialled into a register.

Because the digit storage elements in a register are scanned in advance of the temporary storage elements, examination of the latter is made by an auxiliary reading head known as the "pre-read head" and signals read by this head are designated by the suffix letter P. The pre-read head is positioned at a distance corresponding in track length to one register section in advance of the normal reading head. This enables information stored in a register to be read before that register passes the write head, and the information may therefore be advanced in its position in a register with or without manipulation. The output signal SLP obtained when the pre-read head encounters a 1 written in either of the temporary storage elements, is used to set a relay MAB in the circuit:

$$\text{SLP.}(\text{TX5+6}).\text{TY21—MAB} \quad (1)$$

If relay MAB is set on encountering a 1 stored in element TX5, a second relay MBB is brought into use to detect a possible second 1 written in element TX6. An output signal from relay MAB in the set condition may be used to indicate that a 1 was read during the scan of element TX5, and the circuit which enables relay MBB to be set when a second 1 is encountered is:

$$\text{MAB.SLP.}(\text{TX5+6}).\text{TY21—MBB} \quad (2)$$

The inclusion of a pulse TX5 in this coincidence circuit is not necessary, but the use of the existing timing lead (TX5+6) is not detrimental, and has the advantage of reducing the number of timing leads which have to be provided. When a 1 has been detected in either of the temporary storage elements, the marking must be cancelled, i.e. changed to a 0, to enable a further dialled impulse to be registered. A 0 is therefore written in both these elements during the scan by the normal read and write heads, using the circuit:

$$(TX3-6).T21-SAS \qquad (3)$$

The combined timing lead (TX3–6) is used to avoid the necessity of providing a separate circuit to cancel a marking in element TX3 during the re-transmission of impulses from the register, and although the inclusion of pulses TX3+4 are unnecessary in the present circuit operation, their use is not detrimental.

When markings representing one or more dialled impulses have been detected in the temporary storage elements, the common control equipment must determine to which digits the latest received impulse or impulses belong, and must transfer them to the appropriate digit storage block. In all the digit storage blocks, i.e. blocks TY3–18, element TX2 is used to indicate whether or not a block has a complete digit stored in it. When a complete digit has been registered, element TX2 of that storage block is marked with a 1, this marking being written when an inter-digital pause is detected. When a digit storage block is empty, i.e. the storage elements TX3–6 all contain a 0, or when the storage block contains an incomplete digit, the element TX2 is marked with a 0. When the common equipment is searching for the correct storage block in which to register a dialled impulse, it is only necessary for the reading head to find the first digit storage block with a 0 written in element TX2, and this will be the one awaiting the next impulse. When the required storage block has been located, a relay MCB is set by means of the circuit:

$$MAB.\underline{SLS}.TX2.(TY9-18)-MCB \qquad (4)$$

In all the digit storage blocks, elements TX3–6 are used to store a marking representing a dialled or a translated digit in binary form. When 1 is to be added to a number in binary form, the well known rule is to change all 1's to 0's and 0's to 1's in turn, starting from the lowest order, until a 0 has been changed to a 1. When 2 is to be added, no change is made to the lowest order symbol, but the same rule is applied to the remaining symbols. In the present case, the lowest order binary digit is stored in element TX3, which is thus the first of the four digit elements to pass under the reading head.

The outputs from relays MBB and MCB are employed in adding to a stored digit by means of the circuit:

$$MBB.MCB-SAS \qquad (5)$$

and $$\underline{MBB}.MCB.\underline{SLS}-SBS \qquad (6)$$

The first of these circuits attempts to write 0 in each of the four storage elements of the block identified by the set condition of the relay MCB, while the second writes 1 in each of the four elements in which a 0 is read, thus reversing the marking in each element. The reversal process is stopped when the reading head encounters the first 0, i.e. when the first signal $\underline{SLS}$ occurs, and this signal is used to re-set relays MAB and MCB in the circuit:

$$\underline{MBB}.MCB.\underline{SLS}.(TX3-6)-\underline{MAB} \text{ and } \underline{MCB} \qquad (7)$$

The reversals are thus stopped as soon as a 0 has been changed to a 1, which is the condition for adding 1 to a binary number.

When 2 is to be added to a stored digit, relays MAB, MBB and MCB will all be in the set condition, as previously explained. The two reversal circuits mentioned above are therefore ineffective until relay MBB is re-set during the scan of element TX3, after which reversal is carried out as before, until a 0 has been changed to a 1. The lowest order element, TX3, is therefore unchanged while the remaining orders are manipulated, which is the condition for adding 2. Relay MBB is reset by the circuit:

$$MBB.MCB-\underline{MBB} \qquad (8)$$

Since relay MCB is only set during the scan of an element TX2, relay MBB cannot be re-set until element TX3 is scanned.

A timing circuit is provided for use in connection with the forced release of a relay set and also for metering. The forced release timing count proceeds while dialling is incomplete, this condition being detected by sampling TX2 elements in the digit storage blocks to determine whether any remain marked with a 0. The timing count is cancelled each time the subscriber dials a digit, relay MBB being used for this operation. The receipt of a dialled digit may conveniently be detected by the coincidence employed to terminate the adding process, and in addition to re-setting relays MAB and MCB, this circuit is also used to set relay MBB:

$$\underline{MBB}.MCB.\underline{SLS}.(TX3-6)-MBB \qquad (7)$$

The outputs from relay MAB in its re-set condition and relay MBB in its set condition are employed to cancel the timing count, which was proceeding in block TY20, by means of the circuit:

$$\underline{MAB}.MBB.TY20-SAS \qquad (9)$$

The output of relay MAB is used in this circuit to prevent metering information, which uses the same storage block, being cancelled by the subscriber's impulsing the line during the conversation. In this event relay MCB would not be set because there would be no 0 stored in the TX2 element in any of the storage blocks after dialling has been completed, and thus relay MAB would be left in the set condition.

*Sequence 3.*—Detection of inter-digital pause and marking of storage block last used.

The process of transferring binary digits from the temporary storage elements TX5 and TX6 of block TY21 to the appropriate digit storage blocks continues until the end of an impulse train is reached and the complete digit is registered. Since relay MAB is set when the pre-read head detects a marking representing a dialled impulse in block TY21, and is re-set when the impulse has been transferred to the appropriate store, this relay may be used to detect an inter-digital pause. If relay MAB is in the re-set condition when block TY1 is being scanned by the normal reading head, which follows the scanning of block TY21 by the pre-read head, this is an indication that no dialled impulse has been received since the last scan by the common equipment.

The timing of the inter-digital pause is effected in element TX5 of block TY1. If no impulses have been received during one scan by the common equipment, i.e. in 100 ms., a 1 is written in element TX5.TY1 by the circuit:

$$\underline{MAB}.TX5.TY1-SBS \qquad (10)$$

If relay MAB remains in the re-set condition for a further 100 ms., relay MDB is set by the detection of the 1 written in element TX5.TY1 on the previous scan, by means of the circuit:

$$\underline{MAB}.SLS.TX5.TY1-MDB \qquad (11)$$

The setting of this relay causes a 1 to be written in element TX6.TY1 to mark the end of an impulse train. The circuit for this is:

$$MDB.TY1-SBS \qquad (12)$$

the timing lead TX6 being unnecessary in this coincidence circuit because relay MDB cannot be set until the scan of element TX5.

In the case of a slow dial, it is possible that a dialled impulse may not be registered during a particular scan by the common equipment, and in this case at least one impulse will be registered during the following scan. In this event, a 1 is marked in element TX5, but relay MDB is prevented from being set on the following scan because relay MAB will then be in the set condition, and a 1 is therefore not written in element TX6.TY1.

Relay MDB can now be used to write a "busy" marking in the digit storage block in which a complete digit has last been registered, the busy marking comprising a 1 written in element TX2. The circuit is:

$$\text{MEB.MDB.TX2.(TY9-18)—SBS} \qquad (13)$$

To prevent subsequent storage blocks being wrongly marked busy by this circuit during the same scan, the detection of the 0 written in the TX2 element of the storage block which is being marked busy is used to re-set relay MDB in the circuit:

$$\text{MEB.SLS.TX2.(TY9-18)—}\overline{\text{MDB}} \qquad (14)$$

To prevent a further digit storage block being marked busy on the next scan by the common equipment due to the setting of relay MDB when element TX5.TY1 is scanned, the relay is re-set by the marking in element TX6.TY1, the circuit being:

$$\text{MDB.}\underline{\text{MEB}}\text{.SLS.(TX5+6).TY1—}\overline{\text{MDB}} \qquad (15)$$

The re-set condition output of relay MEB is included in these last three circuits to make them inoperative when relay MEB is set at a later stage.

As soon as a further impulse is received, the interdigital pause indications are cancelled, and to effect this a permanent cancel signal is applied to block TY1 by the circuit:

$$\text{TY1—SAS} \qquad (16)$$

The circuits:

$$\underline{\text{MAB}}\text{.TX5.TY1—SBS} \qquad (10)$$

and $$\text{MDB.TY1—SBS} \qquad (12)$$

however, allow the 1 markings in this block to remain during the interdigital pause, that is to say for as long as relay MAB is in the re-set condition, relay MDB being set on the re-setting of relay MAB as previously described.

*Sequence 4.*—Detection of subscriber's replacing handset, clearing register and release of relay set.

When the calling subscriber replaces his handset, either before or after dialling is completed, the scan of the relay set detects the condition as a line break longer than that of a normal dialled impulse. It is first detected by the pre-read head when element TX4.TY21 is scanned. It will be recalled that in this element a 0 is written when the impulsing lead from the relay set indicates that the subscriber's line loop is opened. A relay MEB is set at the beginning of a line break by the circuit:

$$\text{SLP.TX4.TY21—MEB} \qquad (17)$$

If the line break is due to a dialled impulse, the setting of this relay is ineffective, and it is re-set as soon as an impulse is registered, i.e. when a 1 is written in element TX5 or TX6 of block TY21, the circuit being:

$$\text{SLP.(TX5+6).TY21—}\overline{\text{MEB}} \qquad (18)$$

If, however, relay MEB is not immediately re-set, and if the line loop is not completed after a further 100 ms., relay MDB is set during the scan of element TX5.TY1 as previously described. The coincidence of signals from the relays MDB and MEB in their set condition is employed to apply a general cancel condition to all blocks of the register scanned later than element TX5.TY1. The circuit employed is:

$$\text{MDB.MEB—SAS} \qquad (19)$$

Relay MEB also provides a release signal via the distributing circuit DC to the relay set from a lead POF during the scan of block TY20, this circuit being:

$$\text{MEB.TY20—POF} \qquad (20)$$

All relays are re-set in time for the scan of the next register on the track, and since the pre-read head comes into operation during the scan of element TX4.TY21 of the previous register, the relays are re-set during the scan of element TX2.TY21, the circuit being:

$$\text{TX2.TY21—}\overline{\text{MAB}},\overline{\text{MBB}},\overline{\text{MCB}},\overline{\text{MDB}} \text{ and } \overline{\text{MEB}} \qquad (21)$$

Storage elements of the register which are not cleared by the circuit:

$$\text{MDB.MEB—SAS} \qquad (19)$$

are cleared by the previously-mentioned circuit:

$$\text{(TX3-6).TY21–SAS} \qquad (3)$$

*Sequence 5.*—Detection of loop-closed condition of subscriber's line, addition to timing circuit while dialling is incomplete, transmission of forced release signal on completion of timing count.

If, after lifting his handset and seizing the director equipment, a subscriber fails to dial, or if there is a long pause during dialling, a forced release signal is sent to the relay set after a suitable delay, and the latter is released. A timing circuit is taken into use immediately the closed loop condition of a subscriber's line is detected, and a timing count is initiated. The timing count is cancelled each time a train of dialled impulses is commenced, and is started again at the end of each impulse train. The timing count is completed in about 15 seconds, and if a pause of this length occurs during dialling, a forced release signal is applied to the relay set on completion of the timing count.

In the timing circuit a pulse generator is employed which provides pulses of 100 ms. duration successively on 30 leads TM1–30 in a continuous cycle of three seconds periodicity. Any of these leads may be selected to provide timing pulses at the appropriate rate by means of coincidence circuits which each include one TX pulse lead and one or more TM pulse leads. The timing pulses required to provide the forced release timing count are obtained from the coincidence circuit:

$$\text{TX1.(TM3-11+TM18-26)}$$

The various coincidence circuits used for selecting TM pulses may conveniently be combined in an "or" circuit designated TMT, such that a coincidence in any of the selecting circuits produces an output on a lead TMT. Thus in a coincidence circuit to which input leads TX1 and TMT are connected, an output is obtained each time a TX1 pulse occurs during the timing pulses TM3–11 and TM18–26.

A relay MCG is set when the pre-read head detects a 1 marking in element TX4.TY21 of a register, indicating that the subscriber's line is looped, relay MCG being set by the circuit:

$$\text{SLP.TX4.TY21—MCG} \qquad (22)$$

Relay MCG is immediately re-set if a 1 marking is detected in one of the elements (TX5+6).TY21 of the register, indicating that an impulse train is being received. The circuit for re-setting relay MCG in these circumstances is:

$$\text{SLP.(TX5+6).TY21—}\overline{\text{MCG}} \qquad (23)$$

Relay MCG is also re-set if the full complement of digits has been received by the register, this being indicated by the 1 marking in element TX2 of the storage block TY15, by means of the circuit:

$$\text{SLS.TX2.TY15—}\overline{\text{MCG}} \qquad (24)$$

It will be seen later that a 1 marking is written in elements TX2 of blocks TY16–18 in the case of a local call. In the case of a trunk-dialling call, a marking in element TX2.TY16 indicates that an eighth dialled digit has been registered, and this brings into operation a further timing circuit which will be described later.

The timing markings to be written in block TY20 depend upon the state of relay MCG as this block is scanned, and if relay MCG is set during the scan of the register by the normal read and write heads, due to its having been set during the scan by the preread head, it must be re-set or alternatively be allowed to remain in the set condition prior to the scan of block TY20 to enable the appropriate markings to be added to the timing count. The circuit:

$$TX1.TY19.TMT-\underline{MCG} \qquad (25)$$

is provided, which re-sets relay MCG during the scan of block TY19 on those scans of the register which coincide with the TM timing pulses selected by the coincidence circuit TX1.TMT, i.e. the timing pulses TM3–11 and TM18–26. Relay MCG, if it has previously been set, will be allowed to remain in the set condition during the scan of block TY19 on those scans of the register coinciding with the remaining TM pulses, TM12–17, TM27–30 and TM1–2.

It was mentioned earlier that the rule for adding 1 to a digit in binary form is to change all 0's to 1's and 1's to 9's, starting with the lowest order, until a 0 has been changed to a 1. Three circuits are employed to enable the set condition of relay MCG to add 1 to the timing count in block TY20, these being:

$$MCG.TY20-SAS \qquad (26)$$

and $$MCG.\underline{SLS}.TY20-SBS \qquad (27)$$

$$\underline{SLS}.TY20-\underline{MCG} \qquad (28)$$

The first of these circuits tends to write 0 in each element of block TY20, the second writes 1 in each element in which a 0 was previously written, and the third re-sets relay MCG at the same instant as a 0 is changed to a 1, thereby making the first two circuits ineffective on further elements in block TY20 during that scan.

It will be seen that relay MCG is in the set condition at the commencement of the scan of block TY20 during the occurrence of pulses on twelve of the 30 timing leads TM1–30, i.e. on twelve of the 30 scans of the register which occur during the timing pulse cycle. Since this cycle lasts for three seconds and the full complement of marking signals necessary to restore the elements of block TY20 to the zero condition is 64, it will be seen that the timing count is completed in slightly more than 15 seconds. If relay MCG is not re-set by the circuit:

$$\underline{SLS}.TY20-\underline{MCG} \qquad (28)$$

on any particular scan, this may be taken as an indication that the timing count has been completed, and a forced release signal on lead POF is produced during the scan of block TY21 by means of the circuit:

$$MCG.TY21-POF \qquad (29)$$

Relay MCG is re-set during the scan of this block if it is not required to be set by the next register to be scanned, and this is determined by the pre-read head examining the condiiton of element TX4.TY21 of the next register. If a 0 is stored in this element, relay MCG is re-set by the circuit:

$$\underline{SLP}.TX4.TY21-\underline{MCG} \qquad (30)$$

The timing count is cancelled each time a further train of impulses is received, by means of the previously-mentioned circuit:

$$\underline{MAB}.\underline{MBB}.TY20-SAS \qquad (9, FIG. 4)$$

The circuit:

$$MCG.\underline{SLS}.TY20-SBS \qquad (27)$$

will not be effective in these circumstances because relay MCG is re-set if temporarily stored impulses are detected, by means of the circuit:

$$SLP.(TX5+6).TY21-\underline{MCG} \qquad (23)$$

*Call Discrimination*

The dialling code adopted for obtaining access to a manual board is "100," and the code "0" is used to prefix a call made over the trunk-dialling network. When either of these two codes is registered in the exchange code digit storage blocks of a register, it is arranged that the call is routed to a manual board or to the special register-translator provided for trunk-dialling, as the case may be, without reference being made to the normal translation equipment of the director. The circuits will be described with reference to FIG. 5.

*Sequence 1.*—Detection of manual board code, provision of code for routing to manual board, indication of completion of translation.

In the case of an operator call, it is necessary for the equipment to route the call to an operator when either of the codes "100" or "110" is registered. The latter code could be registered accidently when the code "100" is intended if a subscriber failed to lift his handset cleanly, generating a spurious impulse. If a prefix "1" is accidentally registered when a subscriber dials "0" to obtain access to trunk-dialling equipment, the call may be routed to a manual board. This arrangement is preferable to the use of the code "0" to give access to a manual board and the code "100" for trunk-dialling calls, because a spurious digit transmitted on an operator call would cause the trunk-dialling equipment to be taken into use unnecessarily.

In the following description of the detection of a code in the code digit storage blocks, it will be understood that the markings in elements TX3—6 will be 1, 0, 0, 0 for a code digit "1," and 0, 1, 0, 1 for a code digit "0."

A relay MAM is used to detect the presence of the code digit "1" registered in the first code digit storage block TY9 of a register. The relay is set when a 1 is detected in element TX3. TY9 by the pre-read head, the circuit being:

$$SLP.TX3.TY9-MAM \qquad (1)$$

If the digit stored in this block is greater than "1," a 1 will be stored in one or more of the elements TX4–6, and relay MAM is re-set in these circumstances. The circuit used is:

$$SLP.(TX4-6).TY9-\underline{MAM} \qquad (2)$$

Relay MAM must also be re-set if the second stored code digit is not 0 or 1. As the first digit storage element of block TY10 is scanned, if relay MAM has already been set, a relay MBM is set by means of the circuit:

$$MAM.TX3.TY10-MBM \qquad (3)$$

Relay MBM remains set if the second digit is "0," i.e., if a 1 is marked in elements TX4+6 of this block. The relay MBM is re-set if a 0 is written in either element TX4 or TX6 by the circuit:

$$SLP.(TX4+6).TY10-\underline{MBM} \qquad (4)$$

If the second registered digit is other than "1," relay MAM is re-set by a 1 marking in one or more of the elements (TX4–6). TY10, by means of the circuit:

$$SLP.(TX4-6).TY10-\underline{MAM} \qquad (5)$$

If, however, the second stored digit is "0," so that relay MBM is in the set condition at the end of the scan of the second digit storage block by the pre-read head, relay MAM is set at the beginning of the scan of the next digit storage block by the circuit:

$$MBM.TX1.TY11-MAM \qquad (6)$$

and this circuit also re-sets relay MBM:

$$MBM.TX1.TY11-\underline{MBM} \qquad (6)$$

At the beginning of the scan of the third digit storage block, therefore, relay MAM will be in the set condition only if the first registered digit is "1," and the second registered digit is "0" or "1." During the scan of the third digit storage block, relay MAM is re-set unless the third registered digit is "0," i.e., unless a 1 is marked in elements (TX4+6).TY11. The circuit used is:

$$\underline{SLP}.(TX4+6).TY11 - \underline{MAM} \qquad (7)$$

A relay MCM is set when block TY2 is scanned by the normal reading head, provided relay MAM is already in the set condition, the circuit being:

$$MAM.TY2 - MCM \qquad (8)$$

and this circuit is also used to re-set relay MAM:

$$MAM.TY2 - \underline{MAM} \qquad (8)$$

Since the pre-read head has been used to detect the presence of an operator code in the exchange code storage blocks, relay MCM is set at the beginning of the scan by the normal read and write heads of the register in question.

With relay MCM in the set condition, a 1 is written in each of the elements TX2 of storage blocks TY10–18 to prevent the registration of any further digits which may be dialled, by means of the circuit:

$$MCM.TX2.(TY10-18) - SBS \qquad (9)$$

The appropriate operator routing code is now written in the storage block TY3, and if, as in the present example, the required code is "6," a 1 is written in elements (TX4+5).TY3, and at the same time, busy markings are written in both elements TX1 and TX2 of block TY3, the markings in these two elements enabling the translation digit to be transmitted. The following circuits are used:

$$MCM.TX1.TY3 - SBS \qquad (10)$$
$$MCM.TX2.TY3 - SBS \qquad (11)$$

and $$MCM.(TX4+5).TY3 - SBS \qquad (12)$$

A 1 is now written in element TX2.TY21 to indicate that translation has been effected in the register, the circuit for this being:

$$MCM.TX2.TY21 - SBS \qquad (13)$$

and relay MCM is re-set at the same time by the circuit:

$$TX2.TY21 - \underline{MCM} \qquad (14)$$

The marking written in element TX2.TY21 is used to re-set relay MAM on subsequent scans of the register to prevent the process being repeated. Relay MAM is re-set when the pre-read head encounters this marking, by means of the circuit:

$$SLP.TX2.TY21 - \underline{MAM} \qquad (15)$$

*Sequence 2.*—Detection of trunk-dialling code, provision of code for routing to trunk-dialling equipment, indication of completion of translation.

The detection of "0" registered as the first exchange code digit, indicating that access to the trunk-dialling equipment is required, involves the use of a relay MDM. This relay is set when the first exchange code digit has been registered, i.e. when a 1 marking appears in element TX2.TY9. The circuit is:

$$SLP.TX2.TY9 - MDM \qquad (16)$$

If the first code digit is not "0," relay MDM is re-set. The code digit "0" is indicated by a 1 written in elements (TX4+6) and if the pre-read head reads a 0 in either of these two elements, relay MDM is re-set by the circuit:

$$\underline{SLP}.(TX4+6).TY9 - \underline{MDM} \qquad (17)$$

Relay MDM is also re-set if a 1 marking is detected by the pre-read head in element TX2.TY21, indicating that a translation has already been carried out on the registered code. The circuit employed is:

$$SLP.TX2.TY21 - \underline{MDM} \qquad (18)$$

After the pre-read head has scanned the register in question, if relay MDM remains set, a relay MEM is set at the beginning of the scan of the register by the normal read and write heads by means of the circuit:

$$MDM.TY2 - MEM \qquad (19)$$

and this circuit is also used to re-set relay MDM:

$$MDM.TY2 - \underline{MDM} \qquad (19)$$

When relay MEM is set, a 1 is written into the TX1 elements of the storage blocks TY10–18 to allow further dialled digits to be retransmitted to the trunk-dialling equipment, the circuit being:

$$MEM.TX1.(TY10-18) - SBS \qquad (20)$$

The reason for this will be explained later. The routing code giving access to a trunk-dialling register is now written in the first exchange code storage block, and if as in the present example, this digit is "1," a 1 is marked in element TX3.TY3 by the circuit:

$$MEM.TX3.TY3 - SBS \qquad (21)$$

and busy markings are written in elements TX1 and TX2 of this storage block by the circuits:

$$MEM.TX1.TY3 - SBS \qquad (22)$$

and $$MEM.TX2.TY3 - SBS \qquad (23)$$

Element TX2.TY21 is now marked with a 1 to indicate that translation has been effected, and at the same time relay MEM is re-set, the circuits being:

$$MEM.TX2.TY21 - SBS \qquad (24)$$

and $$MEM.TX3.TY21 - \underline{MEM} \qquad (25)$$

*Sequence 3.*—Marking of incoming busy elements of unwanted storage blocks, other than on trunk-dialling calls.

To prevent unwanted digits being registered on a local call, a busy marking is written in the TX2 elements of blocks TY16–18 as soon as the last numerical digit has been registered in block TY15. A relay MFM is set during the scan of block TY19 by the circuit:

$$TY19 - MFM \qquad (26)$$

and is re-set during the scan of block TY21 if the first registered digit is "0," i.e. if relay MDM has been set, the circuit being:

$$MDM.TY21 - \underline{MFM} \qquad (27)$$

The relay is also re-set if dialling has not been completed, this being indicated by the marking in element TX2.TY15. A 0 written in this element causes relay MFM to be re-set by the circuit:

$$\underline{SLS}.TX2.TY15 - \underline{MFM} \qquad (28)$$

If relay MFM remains in the set condition after the scan of this element, a 1 is marked in the TX2 elements of blocks TY16–18 by means of the circuit:

$$MFM.TX2.(TY16-18) - SBS \qquad (29)$$

*Translation of Local Director Code*

The operation of the circuit will be described with reference to FIG. 6.

*Sequence 1.*—Detection of register awaiting translation, provision of identification marking, transfer of "B" and "C" digits to transfer track, marking transfer track as busy, switching to appropriate library track.

Exchange codes other than the operator code and the trunk-dialling prefix require the use of the transfer track in their translation, which is initiated when a third dialled digit has been registered. When the third code digit has been registered, a 1 will be written in element TX2.TY11 to indicate that a complete digit has been stored in that block. The detection of this marking causes a test to be made of the corresponding element of the transfer track, the marking of which is used to indicate whether or not the transfer track is in use.

The transfer track is provided with a read and a write head which are spaced apart a distance equivalent to seven TY blocks so that information occupying up to seven TY blocks can be stored on this track. The write head is positioned in advance of the read head and is controlled by the read head of the register track for the purpose of transferring the second and third exchange code digits from the register track to corresponding positions on the transfer track. When this transfer is completed, the next section of seven TY blocks of the transfer track will pass under the write head of the transfer track while the section to which the digits have been transferred passes under the read head. The circuits of the read and write heads of the transfer track are so arranged that the information read by the read head from one section of the transfer track is immediately written in by the write head to the next succeeding section of the track. In effect, therefore, this information is circulated round the track until it is eventually cancelled. Because the effective length of the transfer track is only seven TY blocks, the busy marking element of the transfer track appears in positions corresponding to elements TX2.TY4, TX2.TY11, and TX2.TY18 on a register track. If the pre-read head encounters a 1 written in elements TX2.TY11 of a register, and at the same time the transfer track read head detects a 0 in the corresponding element of the transfer track, a relay MAD is set to initiate transfer of the dialled exchange code to the transfer track. The circuit for setting relay MAD is:

$$\text{SLT.SLP.TX2.TY11}-\text{MAD} \quad (1)$$

If the operator code or the trunk-dialling prefix have previously been detected and the corresponding translation made, a 1 will have been written in element TX2.TY21 to indicate that translation of the stored code has been completed. If, therefore, the pre-read head detects a 1 written in this element, relay MAD is re-set by the circuit:

$$\text{SLP.TX2.TY21}-\overline{\text{MAD}} \quad (2)$$

The pre-read head is used in these two circuits so that the condition of the register and transfer track may be determined on the same revolution of the drum as that in which translation is effected, and this permits the holding time of the transfer track by one register to be kept to a minimum.

If at the beginning of a scan of a register by the normal read head, relay MAD is in the set condition, transfer of the exchange code to the transfer track may be commenced. To enable the common control circuit to recognise at a later stage the register from which the code digits have been taken, a 1 is written in element TX4.TY1 of that register when relay MAD is in the set condition, by means of the circuit:

$$\text{MAD.TX4.TY1}-\text{SBS} \quad (3)$$

Translation of the exchange code digits and transfer of routing information to the originating register is completed in one scan of the register tracks by the common equipment, and the identification marking in element TX4.TY1 of a register may therefore be cancelled after one complete scan. A permanent cancel condition may therefore be applied to this element, and this is done by means of the circuit:

$$\text{TY1}-\text{SAS} \quad (16, \text{FIG. 4})$$

described in the common equipment of the impulse registration circuit. A 0 is therefore written in element TX4.TY1 during the scan following that in which the identification marking is written.

The library information, comprising routing codes corresponding to all used exchange codes, is stored on ten library tracks, the library equipment being shown in block form on the drawing, and referenced LTC. The track on which the required routing code is stored is selected by the first exchange code digit, the selection being effected by a combination of four relays, which may conveniently be designated LTS, and which are set in accordance with the four binary digits stored in block TY9 to connect the appropriate library track reading head to the signal lead SLL. The library track selecting relays are re-set at the end of each translation process by means of the circuit:

$$\text{MAD.TY3}-\overline{\text{LTS}} \quad (4)$$

so that these relays are ready for use by the next register containing a code requiring translation. The signals read during the scan of block TY9 are then used to set the library track selecting relays by means of the circuit:

$$\text{MAD.SLS.TY9}-\text{LTS} \quad (5)$$

The second and third exchange code digits are now transferred from blocks TY10 and TY11 of the register to the corresponding position on the transfer track, and at the same time the transfer track is cleared of any existing markings. The circuit for this latter operation is:

$$\text{MAD.(TY10+11)}-\text{SAT} \quad (6)$$

and the circuit for transfer of information is:

$$\text{MAD.SLS.(TY10+11)}-\text{SBT} \quad (7)$$

It will be observed that in this last circuit, a 1 is written on the transfer track each time a 1 is encountered on the register track, so that at the end of the scan of blocks TY10 and TY11 the two tracks contain corresponding markings in that particular section. It will be appreciated that the busy markings comprising a 1 written in elements TX2.TY10 and TX2.TY11 will also be transferred, and the latter provides a busy marking for the transfer track. The output of relay MAD in its set condition is included in the last four coincidence circuits to confine the operations to the register which has seized the transfer track.

Relay MAD is re-set by the busy marking on the transfer track when it is detected by the read head of the transfer track seven TY pulses later, i.e. during the timing pulse TX2.TY18, by means of the circuit:

$$\text{SLT.TX2.TY18}-\overline{\text{MAD}} \quad (8)$$

If two adjacent registers require translation of a stored code, the second register to be scanned will be scanned by the pre-read head at the same time as the first register is being scanned by the normal read head, and the test of the busy marking element of the transfer track for the second register would occur at the same instant as a busy marking was being written in this element from the first register, and the transfer track would appear to be free as far as the second register was concerned. However, the last-mentioned circuit would re-set relay MAD before the commencement of the scan of the second register by the normal read head, so that no possibility exists of two registers using the transfer track simultaneously.

*Sequence 2.*—Search for address, transfer translation to transfer track.

The two digit code now written on the transfer track is compared in turn with addresses comprising all possible two digit codes, which are permanently stored on the address track. These addresses are written in the same form as the two digit code is written on the transfer track, and are arranged at intervals of seven TY blocks round the track in such positions that the code circulating on the transfer track appears opposite each address in turn. Although the two digit code was written during the timing pulse (TY10+11), it will also be read from the transfer track during the timing periods (TY17+18) and (TY3+4), and these three timing periods in each TZ period correspond to the storage positions of addresses on the address tracks. A relay MBD is set before each address is reached by means of the circuit:

$$\text{TX6.(TY1+8+15)}-\text{MBD} \quad (9)$$

and two comparison circuits, to which signals read from both the transfer and address tracks are applied simultaneously, are used to reset relay MBD when signals read from one track fail to agree with signals read from the other. These circuits are:

$$\text{SLT.}\underline{\text{SLA}}.(\text{TY3}+4+10+11+17+18)-\underline{\text{MBD}} \qquad (10)$$

and $$\underline{\text{SLT}}.\text{SLA}.(\text{TY3}+4+10+11+17+18)-\underline{\text{MBD}} \qquad (11)$$

In the drawings, the timing pulse sequence $$(\text{TY3}+4+10+11+17+18)$$

is abbreviated to TYA. If relay MBD is in the set condition when any of the three elements TX6.(TYL+8+15) is reached, the markings in the previous code storage blocks of the transfer and address tracks must have been found to correspond, and a relay MCD is set to indicate that the required address has been found. The circuit for setting relay MCD is:

$$\text{MBD.TX6.}(\text{TY1}+8+15)-\text{MCD} \qquad (12)$$

The two exchange code digits written on the transfer track may now be replaced by the routing code corresponding to the address, and reference must therefore be made to the selected library track for the translation information. The translation codes corresponding to the various codes stored on the address track are stored on the library tracks in the same way as the address codes, i.e. at intervals of seven TY blocks, although the translation code may contain up to six routing digits. There is a displacement of one section of seven TY blocks between the addresses and their corresponding translation codes, so that the translation is read immediately after its corresponding address has been read, the translation being written in sections corresponding to blocks TY2–8, TY9–15 and TY16–1. The seven TY blocks are required to cater for six possible routing digits and the corresponding metering information.

After relay MCD has been set, the routing digits and metering information from the following section of seven TY blocks on the selected library track is written into the transfer track by means of the circuit:

$$\text{MCD.SLL}-\text{SBT} \qquad (13)$$

while at the same time, the existing exchange code digits are cancelled from the transfer track by means of the circuit:

$$\text{MCD}-\text{SAT} \qquad (14)$$

Each routing digit stored on a library track is accompanied by a 1 marking in elements TX1 and TX2 of the same storage block, and these markings are transferred with the routing digits to the transfer track. When this transfer is completed, relay MCD is re-set by means of the circuit:

$$\text{MCD.TX6.}(1+8+15)-\underline{\text{MCD}} \qquad (15)$$

*Sequence 3.*—Selection of originating register, transfer of translation to register, discrimination between normal calls and code only and unused code calls, release of transfer track.

The translation is now circulated on the transfer track until the originating register is reached, and although the two comparison circuits previously mentioned are still operative, relay MBD is re-set at each address because of the 1 markings now written in the TX1 elements of the transfer track. There is thus no possibility of a false translation being made if two of the routing digits circulating on the transfer track should coincide with an address on the address track. The identification marking in element TX4.TY1 of the originating register is detected by relays MDD and MED during the scan following the writing of this marking, and this allows the duration of a complete scan by the common equipment for the translation process to be completed. The circuit for setting relays MDD and MED is:

$$\text{SLS.TX4.TY1}-\text{MDD and MED} \qquad (16)$$

As soon as relay MDD has been set, transfer of digits from the transfer track to the routing digit storage blocks of the register takes place, the transfer circuit being:

$$\text{MDD.SLT.}(\text{TY2-8})-\text{SBS} \qquad (17)$$

and at the same time the transfer track is cleared by means of the circuit:

$$\text{MDD.}(\text{TY2-8})-\text{SAT} \qquad (18)$$

In the case of a "code only" call, i.e. a call not requiring numerical digits, or when a false code has been dialled, it is desirable to prevent registration of numerical digits, and in the latter case the director relay set must also be released. In the code storage blocks of the library tracks, a 1 is marked in element TX1 of the metering information block TY2 for all codes except those used in a "code only" call, and, as previously explained, this marking is returned to the originating register with the translation code. The detection of this marking by the read head of the transfer track after the originating register has been reached is used to set a relay MFD, by means of the circuit:

$$\text{MDD.SLT.TX1.TY2}-\text{MFD} \qquad (19)$$

and in the set condition this relay is used to mark elements TX1 in all the numerical digit storage blocks of the register by means of the circuit:

$$\text{MFD.TX1.}(\text{TY12-15})-\text{SBS} \qquad (20)$$

to enable the stored numerical digits to be re-transmitted, since the marking in element TX1 of a digit storage block determines whether or not a digit stored therein is to be transmitted. In the case of a "code only" call, the absence of a 1 in element TX1.TY2 of the translation prevents relay MFD from being set, and 1 markings will not be written in elements TX1 of the numerical digit storage blocks, so that if numerical digits have been registered, they will not be re-transmitted. In the case of an unused code being dialled, no corresponding translation will be stored in the library tracks, and no 1 marking in any TX1 elements of the routing code or metering information blocks will be returned to the register. This avoids the possibility of false digits being transmitted.

When a used code has been dialled and its translation returned to the register, the detection of a 1 marking in element TX1 of block TY2, in the case of a call involving numerical digits, will cause relay MED to be re-set by means of the circuit:

$$\text{MDD.SLT.TX1}-\underline{\text{MED}} \qquad (21)$$

If relay MED has not been set by the end of the scan of the register, the dialling of an unused code is indicated, and the relay in its set condition is used to provide a forced release signal POF to the director relay set by means of the circuit:

$$\text{MED.TY20}-\text{POF} \qquad (22)$$

In the case of an unused code being dialled, or a "code only" call, it is desirable to prevent the registration of numerical digits, and 1 markings are therefore written in element TX2 of the numerical digits storage blocks. It will be recalled that relay MFD is set only in the case of a normal call, and the re-set condition of this relay may therefore be used to indicate the registration of an unused code or a code requiring no numerical digits. The circuit for writing busy markings in elements TX2 of the numerical digit storage blocks is:

$$\text{MDD.}\underline{\text{MFD}}.\text{TX2.}(\text{TY9-18})-\text{SBS} \qquad (23)$$

When the translation process has been completed, a 1 marking is written into element TX2.TY21 of the register by the circuit:

$$\text{MDD.TX2.TY21}-\text{SBS} \qquad (24)$$

to prevent the repetition of translation due to the resetting of relay MAD, if this should be re-set during the next scan by the previously-mentioned circuit:

$$SLP.TX2.TY21-\underline{MAD} \qquad (2)$$

At the end of the scan of the register after translation has been completed, relays MDD and, if necessary, MED and MFD are all re-set by means of the circuit:

$$TX2.TY21-\underline{MDD}, \underline{MED} \text{ and } \underline{MFD} \qquad (25)$$

*Traffic Recording (Sequence 4)*

It is sometimes desirable to determine the frequency with which a particular code is dialled, and it is most convenient to do this at the translation stage. In the system being described, any translation code stored in the library may be marked in a characteristic manner, so that when this translation is written on the transfer track, the characteristic marking is detected. The detecting equipment only requires to be connected to a conventional counting circuit to provide an indication of the frequency with which the corresponding exchange code is dialled.

The characteristic marking referred to is a 1 written in element TX3.TY2, or its equivalent, in a translation code section of a library track. In block TY2, element TX1 is employed to detect a "code only" call, element TX2 is involved in writing information into library tracks, and elements TX4–6 are used to store the meter code digit. All these markings are transferred to the transfer track when the corresponding address is found to coincide with an exchange code circulating on the transfer track.

A relay MTR is set when the transfer track reading head detects a 1 marking in element TX3.TY2, by means of the circuit:

$$SLT.TX3.TY2-MTR$$

The relay is re-set on the occurrence of the following timing pulse TX1.TY2 by the circuit:

$$TX1.TY2-\underline{MTR}$$

so that the relay remains set for slightly less than the scanning period of a register. This enables an output to be taken from it to external counting equipment TR.

*Transmission of Impulses From a Director Register*

After translation, the register will contain one or more routing digits stored in blocks TY3–8, and possibly one or more numerical digits. In the case of an operator call or a "code only" call, the register will immediately proceed with the transmission of the translated code digits, the numerical digit storage blocks being closed to the reception of further dialled impulses and also closed to the re-transmission of possible digits stored in them.

In the case of a call to an exchange in the local director network, the translated routing digits will be transmitted, followed by the numerical digits as these are received, a circuit being provided to prevent a train of impulses from being re-transmitted until it has been completely registered. To cater for the requirements of large P.A.B.X. groups, the third numerical digit is not re-transmitted until the fourth numerical digit has been registered, when the two digits are transmitted with the minimum interdigital pause.

In the case of a call involving the use of trunk-dialling equipment, the translated code digit is first transmitted to set up a path through the 1st code selector to a trunk dialling relay set, into which the exchange code and numerical digits are re-transmitted as they are received.

Stored digits are transmitted by subtracting one from the digit during each scan, and at the same time sending a pulse to the relay set, which repeats it to the selector switches as an impulse of correct length and shape. The scanning period of the common equipment is 100 ms., i.e. each register is scanned once every 100 ms., so that the impulsing rate is ten impulses per second. When the number stored in a storage block is reduced to zero, an interdigital pause timing period is started, and at the end of this period, the digit in the next occupied storage block is transmitted in a similar manner.

When a stored digit is to be transmitted, a 1 is marked in element TX1 of the appropriate digit storage block. This is done, as previously explained, when routing digits have been returned from a translator to a register, the translated code also including a 1 marking in the appropriate TX1 element. Numerical digit storage blocks are similarly marked when the trunk-dialling prefix is detected, as was described earlier. The circuit will be described with reference to FIG. 7.

*Sequence 1.*—Detection of first digit storage block marked "outgoing busy," subtraction of one from number stored therein, transmission of one impulse from register.

When a 1 is detected in element TX1 of a digit storage block, relay MAE is set by the circuit:

$$\underline{MBE}.SLS.TX1.(TY3\text{-}18)-MAE \qquad (1)$$

The output from the relay MBE in its re-set condition is included in this coincidence circuit to avoid confusion with a later circuit in which the output of relay MBE in the set condition is used. To prevent the transmission of digits catching up with the reception of dialled digits, relay MAE is re-set if the following digit has not yet been completely registered, and this is detected by examining the TX2 element of that digit storage block, which it will be recalled, is only marked with a 1 when a complete digit has been registered.

The circuit used is:

$$\underline{MCE}.\underline{SLS}.TX2-\underline{MAE} \qquad (2)$$

The output of the relay MCE in its re-set condition is included in this coincidence circuit to prevent relay MAE being re-set during the transmission interdigital pause, when relay MCE is set.

To subtract one from a binary number, the well-known rule is to change 1's to 0's and 0's to 1's, starting with the lowest order, until a 1 has been changed to a 0. This reversal is effected by three circuits. The first:

$$MAE.\underline{MBE}.\underline{MCE}.(TX3\text{-}6)-SAS \qquad (3)$$

tends to write 0 in each digit storage element, while the second:

$$MAE.\underline{MBE}.\underline{MCE}.SLS.(TX3\text{-}6)-SBS \qquad (4)$$

writes a 1 in each storage element which previously contained a 0. The third circuit:

$$MAE.\underline{MCE}.SLS.(TX3\text{-}6)-MBE \qquad (5)$$

sets relay MBE when the first 1 of the original number has been detected, and prevents the further operation of the previous two circuits as soon as the 1 has been changed to a 0. The setting of relay MBE is also used to send an impulse to the relay set via a circuit POI, the impulse being sent at the end of the scan of the register by the circuit:

$$MBE.\underline{MCE}.TY21-POI \qquad (6)$$

The output of relay MCE is again included in all of these coincidence circuits to prevent operation on a stored digit during the interdigital pause. Relays MAE and MBE are re-set during the scan of element TX3.TY21 by the circuit:

$$TX3.TY21-\underline{MAE} \text{ and } \underline{MBE} \qquad (7)$$

the signal to the circuit POI being thus confined to the scan of elements (TX1–3).TY21.

*Sequence 2.*—Detection of start of inter-digital pause, marking of inter-digital pause indication.

Relay MBE is set when a 1 is detected in one of the storage elements TX3–6 of a digit storage block, and it follows that if, with relay MAE in the set condition, relay MBE is still in the re-set condition after element TX6 has been scanned, there can be no binary digit remaining in that particular block, indicating that transmission of the digit is complete. Relay MCE is set when this condition is detected, by means of the circuit:

$$\text{MAE}.\overline{\text{MBE}}.\text{SLS}.\text{TX6}\text{—MCE} \qquad (8)$$

but at the same time, the previously-mentioned circuit:

$$\text{MAE}.\overline{\text{MBE}}.\overline{\text{MCE}}.\text{SLS}.(\text{TX3–6})\text{—SBS} \qquad (4)$$

will be operative to write 1 in storage elements TX3–6 of the storage block.

A 1 is now written into element TX3.TY21 to indicate commencement of the inter-digital pause, the outputs of relays MAE and MBE being used for this in the circuit:

$$\text{MAE}.\overline{\text{MBE}}.\text{TX3}.\text{TY21}\text{—SBS} \qquad (9)$$

after which relay MAE is re-set by the previously-mentioned circuit:

$$\text{TX3}.\text{TY21}\text{—}\overline{\text{MAE}} \qquad (7)$$

*Sequence 3.*—Timing inter-digital pause.

The inter-digital pause marking in element TX3.TY21 is detected during the next scan by the pre-read head, and is used to set relay MCE, if this relay has not already been set, before the normal scan of the register whose stored information is being transmitted. The circuit is:

$$\text{SLP}.\text{TX3}.\text{TY21}\text{—MCE} \qquad (10)$$

The inter-digital pause is timed by means of markings written in elements (TX2+3).TY1. When relay MCE is set, a 1 is written in element TX2.TY1 by means of the circuit:

$$\overline{\text{MAE}}.\text{MCE}.(\text{TX2+3}).\text{TY1}\text{—SBS} \qquad (11)$$

A 1 is not at this time marked in element TX3.TY1, because relay MAE is set when the existing 0 marking in element TX2.TY1 is detected by a circuit:

$$\text{MCE}.\overline{\text{SLS}}.(\text{TX2+3}).\text{TY1}\text{—MAE} \qquad (12)$$

A circuit:

$$(\text{TX3–6}).\text{TY21}\text{—SAS} \qquad (3, \text{FIG. 4})$$

mentioned in connection with the registration of impulses, tends to cancel the inter-digital pause marking on each scan, and the set condition of relay MAE is used to re-write this marking on each scan during the inter-digital pause. The previously-mentioned circuit:

$$\text{MAE}.\overline{\text{MBE}}.\text{TX3}.\text{TY21}\text{—SBS} \qquad (9)$$

becomes effective when relay MAE is set. Relay MCE must be re-set for the next register to be scanned if that register is not also involved in timing an inter-digital pause, and the condition of the inter-digital pause element TX3.TY21 is again determined by means of the pre-read head. If a 0 is marked in this element, relay MCE is re-set by the circuit:

$$\overline{\text{SLP}}.\text{TX3}.\text{TY21}\text{—}\overline{\text{MCE}} \qquad (13)$$

If the following register is engaged in timing an inter-digital pause, relay MCE is left in the set condition.

On the next scan of the transmitting register by the common equipment, relay MCE will already have been set when the pre-read head detected the presence of a 1 in element TX3.TY21 as mentioned earlier, and on this scan a 1 will be marked in element TX3.TY1 by means of the previously-mentioned circuit:

$$\overline{\text{MAE}}.\text{MCE}.(\text{TX2+3}).\text{TY1}\text{—SBS} \qquad (11)$$

Relay MAE is set on the scan of element TX3.TY1 by means of another previously-mentioned circuit:

$$\text{MCE}.\overline{\text{SLS}}.(\text{TX2+3}).\text{TY1}\text{—MAE} \qquad (12)$$

Relay MAE is re-set as before when element TX3.TY21 is scanned, and remains re-set until during the third scan by the common equipment in the inter-digital pause period, the 1 marking is detected in element TX1 of the digit storage block from which the digit has last been transmitted, when the relay is set by its initial setting circuit:

$$\overline{\text{MBE}}.\text{SLS}.\text{TX1}.(\text{TY3–18})\text{—MAE} \qquad (1)$$

At the same time the 1 marking in this TX1 element is cancelled by the circuit:

$$\text{MAE}.\overline{\text{MBE}}.\overline{\text{MCE}}.\text{TX1}.(\text{TY3–18})\text{—}\overline{\text{SAS}} \qquad (14)$$

It was mentioned earlier that when the storage block from which a digit has last been transmitted was detected as being empty, the circuit used for changing 0's to 1's in the digit stores will have replaced all the 0's in the empty store with 1's. The reversal circuits will not, however, have been effective during the first part of the inter-digital pause because of the set condition of relay MCE. The full complement of 1's in this storage block is now reduced, one at a time, on the fourth, fifth, sixth and seventh scans of the register by the common equipment. The circuit used for cancelling these markings is:

$$\text{MAE}.\overline{\text{MBE}}.\text{MCE}.(\text{TX3–6}).(\text{TY3–18})\text{—}\overline{\text{SAS}} \qquad (15)$$

Relay MAE is again set when the first 1 is detected in elements TX3–6 of the appropriate storage block, to ensure that only one element has its 1 marking cancelled on each scan, and also to prevent the detection of a marking in a subsequent digit storage block. The circuit for setting relay MAE is:

$$\overline{\text{MBE}}.\text{MCE}.\text{SLS}.(\text{TX3–6}).(\text{TY3–18})\text{—MAE} \qquad (16)$$

At the end of each scan, relay MAE is re-set when element TX3.TY21 is scanned, as previously explained, the set condition of the relay when this element is reached being effective in re-writing the inter-digital pause marking by the circuit:

$$\text{MAE}.\overline{\text{MBE}}.\text{TX3}.\text{TY21}\text{—SBS} \qquad (9)$$

described earlier.

*Sequence 4.*—Detection of end of inter-digital pause, detection of end of transmission of digits, clearance of timing block, cancellation of inter-digital pause and timing control markings.

The end of the inter-digital pause timing period is detected during the seventh scan following the first marking of element TX3.TY21. At the time of this scan, the 1's in the storage block from which the stored digit has last been transmitted will have been cleared, except for that in element TX6. If element TX6 of this block is reached without relay MAE having been set, relay MBE is set, to indicate the end of the interdigital pause, by means of the circuit:

$$\overline{\text{MAE}}.\text{MCE}.\text{SLS}.\text{TX6}.(\text{TY3–18})\text{—MBE} \qquad (17)$$

while relay MAE is set by the marking in element TX6 of this storage block. The setting of relay MBE now prevents the continued marking of a 1 in element TX3.TY21 by the circuit:

$$\text{MAE}.\overline{\text{MBE}}.\text{TX3}.\text{TY21}\text{—SBS} \qquad (9)$$

and the circuit:

$$\text{TX3}.\text{TY21}\text{—SAS} \qquad (3, \text{FIG. 4})$$

which has previously been ineffective because of the preference given to the signal on lead SBS, now cancels the inter-digital pause marking. Relay MAE will, however, be re-set by this marking before it is cancelled.

On the following scan by the common equipment, relay MCE will be re-set before the normal scan of the register in question, when the pre-read head encounters a 0 in element TX3.TY21, by means of the previously-mentioned circuit:

$$\overline{\text{SLP}}.\text{TX3}.\text{TY21}\text{—}\overline{\text{MCE}} \qquad (13)$$

Relay MAE is again set when a 1 marking is encountered in element TX1 of the digit storage block containing the stored digit next to be transmitted, by means of the circuit:

$$\overline{\text{MBE}}.\text{SLS}.\text{TX1}.(\text{TY3–18})\text{—MAE} \qquad (1)$$

and the process is repeated for this and subsequent digits.

It will be seen that the timing of the inter-digital pause occupies eight scans by the common equipment, thus providing an inter-digital pause of 800 ms.

During the transmission of a digit, relay MCE is re-set by the absence of a marking in the inter-digital pause element TX3.TY21, so that the circuit used for writing the timing marking in block TY1:

$$\overline{MAE}.MCE.(TX2+3).TY1—SBS \qquad (11)$$

is no longer effective, and a further circuit:

$$(TX2+3).TY1—SAS \qquad (16, FIG. 4)$$

described in connection with the registration of dialled impulses, and which was previously ineffective because of the last-mentioned circuit, will now cancel this marking.

Relay MAE is used to give an indication when all the stored digits, which may include routing and numerical digits, have been transmitted. It will be recalled that relay MAE is set each time a 1 marking is detected in one of the digit storage elements in blocks TY3–18 by the circuit:

$$MBE.MCE.SLS.(TX3–6).(TY3–18)—\overline{MAE} \qquad (16)$$

and is normally re-set at the end of the register scan by the circuit:

$$TX3.TY21—MAE \qquad (7)$$

Now relay MBE is set at the end of an inter-digital pause as previously explained, and the set condition of this relay is employed to re-set relay MAE if a further stored digit is to be transmitted, i.e. when a 1 marking is detected in the TX1 element of a digit storage block, the circuits being:

$$MBE.SLS.TX1(TY2–8)—MAE \qquad (18)$$

and $$MBE.SLS.TX1.(TY12–15)—MAE \qquad (19)$$

A further circuit:

$$MBE.SLS.(TX3–6).(TY16–18)—MAE \qquad (20)$$

is provided to re-set relay MAE if a digit is stored in blocks TY16–18. Thus the persistent set condition of relay MAE may be used to indicate that no more digits requiring to be transmitted remain in the register.

Considering the use of these three circuits in more detail, in the case of a "code only" call, in which only the code digits, e.g. "100" or "999," are dialled, routing digits will be written in one or more of the storage blocks TY3–8, these digits alone being required to route the call. It will be recalled that for this type of call, no 1 markings were written in any of the TX1 elements of the numerical digit storage blocks. While the routing digits are being transmitted, relay MAE will be re-set on each scan by the circuit:

$$MBE.SLS.TX1.(TY2–8)—MAE \qquad (18)$$

but when these digits have been transmitted and the 1 markings in the respective TX1 elements have been cancelled, relay MAE will remain set until the scan reached element TX3.TY21, when it is re-set as previously described. If the end of an inter-digital pause has been reached, resulting in relay MBE being set, and relay MAE has not been re-set by a marking in any of the numerical digit storage blocks, a signal indicating the end of impulsing is applied via a circuit POC to the relay set, during the scan of element TX6.TY19, the circuit employed being:

$$MAE.MBE.MCE.TX6.TY19—POC \qquad (21)$$

For a normal call to another subscriber via the director equipment, the numerical digits stored in blocks TY12–15 must also be transmitted, and the numerical digit storage blocks will have a 1 marking written in their TX1 elements as previously described. The further circuit is therefore provided for re-setting relay MAE when numerical digits have been stored:

$$MBE.SLS.TX1.(TY12–15)—MAE \qquad (19)$$

Exchange code digits are not normally required to be retransmitted in a local director call, and timing leads TY9–11 are therefore not included in this circuit.

If the first digit dialled is "0," indicating that the call is to be routed via trunk-dialling equipment, the number of additional digits dialled may vary between six and nine, and because it is not possible to determine beforehand the actual number of digits that will be dialled for a particular call, the TX1 elements of the exchange code and numerical digit storage blocks TY10–18 are marked by the circuit:

$$MEM.TX1.(TY10–18)—SBS \qquad (20, FIG. 5)$$

mentioned earlier in the description. When the stored digits are re-transmitted to the trunk-dialling register, the circuits:

$$MBE.SLS.TX1.(TY2–8)—MAE \qquad (18)$$

and $$MBE.SLS.TX1.(TY12–15)—MAE \qquad (19)$$

are effective, and the further circuit:

$$MBE.SLS.(TX3–6).(TY16–18)—MAE \qquad (20)$$

is employed to cater for possible eighth, ninth and tenth digits. This last circuit does not include element TX1, but instead the actual digit storage elements (TX3–6) are scanned to determine when these storage blocks have been cleared. This is necessary because of the variable number of digits dialled in a trunk-dialling call, when special precautions must be taken to ensure that when all the stored digits have been cleared, the end of dialling signal is not given if additional digits are still to be dialled. This is determined as follows.

A four second timing period is commenced as soon as an eighth digit has been stored in block TY16, and is re-commenced for each subsequent digit registered. The circuit providing the timing period will be described later. If the timing period expires without a further digit being received, this is taken as an indication that dialling is complete, and a 1 is written in element TX4.TY19. The absence of a 1 in this element prevents the operation of circuit POC by re-setting relay MAE on each scan, until the element is marked to indicate that the four second timing period has elapsed. The circuit used for this operation is:

$$MBE.SLS.TX4.TY19—MAE \qquad (22)$$

It will be understood that this four second timing period is only initiated when the call is to be routed via trunk-dialling equipment, and if the first dialled digit is other than "0," a 1 is marked in element TX4.TY19 by the circuit:

$$MFM.TX4.TY19—SBS \qquad (30, FIG. 5)$$

relay MFM being set when the first dialled digit is other than "0" as previously explained.

The four second timing period involves the use of block TY20 which is also used for metering, and it is essential that this block should be cleared when transmission of digits is complete. If relays MAE, MBE and MCE are all in the set condition at the end of the scan of block TY18, the register has no more stored digits awaiting transmission, and these relays are used to clear the timing elements by means of the circuit:

$$MAE.MBE.MCE.TY20—SAS \qquad (23)$$

It is possible, however, that on a particular trunk-dialling call, ninth and tenth digits are not required so that no digits are stored in blocks TY17+18, although the TX1 element in these blocks will be marked with a 1 to enable possible ninth and tenth digits to be re-transmitted. These markings will eventually be cancelled after the appropriate inter-digital pause timing periods by the previously-mentioned circuits, even though the end of dialling signal POC will already have been sent to the relay set. When the last TX1 marking has been cancelled, the three relays MAE, MBE and MCE will again all be set, and the cancel condition will again be effective in block TY20. There is a possibility that in the three inter-digital pause periods since the end of dialling signal was sent to the register, the trunk-dialling equipment could have established the connection and the called subscriber could have answered. Under these circumstances, the clearing of block TY20 would cancel the metering timing count, and the first meter pulse would be lost. This would not occur if a full complement of ten code and numerical digits were stored, because relay MAE would be re-set by the marking in element TX3.TY21, before this was finally cleared, immediately after the last digit had been re-transmitted, and the clearing circuit for block TY20 would therefore be operative on only one scan. To provide similar conditions in the case of a call requiring no ninth and tenth digits, a 1 marking is written in element TX1.TY19 by the relay MAE, MBE and MCE in their set condition on the scan subsequent to the transmission of the end of dialling signal by the circuit:

MAE.MBE.MCE.TX1.TY19—SBS     (24)

and on the next scan this marking is used to re-set relay MAE, in the circuit:

SLS.TX1.TY19—MAE     (25)

and this prevents the continued clearing of the meter timing block by the circuit:

MAE.MBE.MCE.TY20—SAS     (23)

*Sequence 5.*—Delay of transmission of numerical digits, delay of transmission of units digits.

In some director calls it may be necessary to delay the retransmission of numerical digits until a signal has been returned over the junction from the wanted exchange to indicate that the numerical digits can be accepted. This occurs in the case of exchanges employing coded call indicators, where the coding apparatus may not be available when the junction is taken into use. In such a case, a signal is received by the register from the local relay set via a circuit PIB, and this serves to restrain transmission of digits if the code digits have been transmitted. This signal sets a relay MDE during the scan of block TY2 in the circuit:

PIB.TY2—MDE     (26)

If relay MAE is set by the circuit:

MBE.SLS.TX1.(TY3–18)—MAE     (1)

due to the presence of a 1 marking in element TX1 of a digit storage block, it is immediately re-set on the scan of the following element by the circuit:

MCE.MDE.TX2—MAE     (27)

before transmission of the stored digit is commenced. The output of the relay MCE is included in this circuit to prevent interference with relay MAE during the inter-digital pause. It will be understood that the signal PIB would only be received if a junction had been taken into use, and the restraint on impulsing will therefore only apply to the numerical digits. Relay MDE is re-set on each scan of the common equipment by the circuit:

TX3.TY21—MDE     (28)

It is desirable to transmit the tens and units digits without a long pause in between to cater for a call to a large P.A.B.X. group, and circuits are provided to prevent the transmission of a tens digit until a units digit has been registered. Considering the case of a local director call, if the units digit has not been registered, a 0 marking exists in element TX2.TY15, and when this is detected by the pre-read head, relay MEE is set by the circuit:

SLP.TX2.TY15—MEE     (29)

The output of relay MEE in the set condition is used to set relay MDE as the first element of the tens digit storage block TY14 is being scanned, the circuit being:

MEE.MFE.TY14—MDE     (30)

Relay MFE is included in the above circuit to prevent its operation in the case of a trunk-dialling call, and its function will be explained presently. As previously explained in connection with a call to an exchange employing coded call indicators, relay MDE in its set condition prevents the transmission of a further digit by re-setting relay MAE in the circuit:

MCE.MDE.TX2—MAE     (27)

Relay MEE is re-set during the scan of the next register by the pre-read head, before the units digit storage block is scanned, by means of the circuit:

TY14—MEE     (31)

Relay MDE is re-set at the end of the scan of a register by means of the circuit:

TX3.TY21—MDE     (28)

and the process is repeated until a complete units digit is registered.

*Sequence 6.*—Prevention of delay in transmitting units digit for trunk-dialling call.

In the case of a trunk-dialling call, the digits contained in the director register are re-transmitted to the trunk-dialling register, and the facility of restraining the tens digit is not required. If the digit stored in block TY9 is "0," i.e. if elements TX4 and TX6 of this block are both marked with a 1, relay MEE is set and remains set during the scan of the block. Relay MFE is first set by the circuit:

SLS.TX4.TY9—MFE     (32)

and is re-set if a 0 marking is encountered in element TX6, by the circuit:

MFE.SLS.TX6.TY9—MFE     (33)

Thus if a 0 has been registered as the first dialled digit, the set condition of relay MFE prevents relay MDE from being set by the previously-mentioned circuit:

MEE.MFE.TY14—MDE     (30)

and the digit stored in element TY14 is transmitted in the normal manner. Relay MFE is re-set by the circuit:

TY15—MFE     (34)

*Four Second Timing Circuit*

*Sequence 7.*—Commencement of timing count when eighth dialled digit is registered, detection of 40 stored in timing block, marking indication at end of timing count.

Relay MFE is also used in the four second timing circuit which is employed in detecting the end of dialling. The relay is set when the eighth dialled digit has been received, i.e. when a 1 marking is detected in element TX2.TY16, by means of the circuit:

SLS.TX2.TY16—MFE     (35)

If the four second timing circuit has already operated, and a marking to indicate this has been written in element TX2.TY18, relay MFE is re-set when this marking is detected, by means of the circuit:

SLS.TX2.TY18—MFE     (36)

If relay MFE remains set until block TY20 is reached, a counting process is commenced by means of the circuits:

MFE.TY20—SAS     (37)

MFE.SLS.TY20—SBS     (38)

and

SLS.TY20—MFE     (39)

As previously explained, the condition for adding to a binary digit is to change 0's to 1's and 1's to 0's, commencing with the lowest order, until a 0 has been changed to a 1.

The first of the three last-mentioned circuits changes all 1's to 0's, the second changes 0's to 1's, and the third resets relay MFE as soon as a 0 is detected (which occurs at the same instant as the 0 is changed to a 1), and prevents further changes being made to the stored digit.

Since the scanning rate is ten scans per second, a count of 40 is required to provide the four second delay. All six storage elements of block TY20 are required to register this count. If the before the count reaches 40 a further digit is dialled, the block TY20 is cleared due to the coincidence circuit that is employed to terminate the adding process in a digit storage block when an impulse is being registered, which sets relay MBB and re-sets relay MAB. The outputs of these relays are used in the circuit:

$$\overline{MAB}.MBB.TY20-SAS \qquad (9, FIG. 4)$$

which was mentioned in connection with the registration of dialled impulses.

When all digits have been dialled and the count in block TY20 reaches 40, i.e. elements TX4 and TX6 both contain a 1, relay MGE is set during the scan of block TY20 by the pre-read head, and remains set. The circuits employed are:

$$SLP.TX4.TY20-MGE \qquad (40)$$

and $$SLP.TX6.TY20-\overline{MGE} \qquad (41)$$

It will be seen that by means of these circuits relay MGE is set if the pre-read head detects a 1 in element TX4 and is only re-set if a 0 is detected in element TX6 of block TY20.

To prevent further dialled digits being registered, relay MGE in the set condition is used to mark the TX2 elements in all the storage blocks not required by the dialled code, including element TX2.TY18, which is the element used to indicate completion of the four second timing count. The circuit used is:

$$MFE.MGE.TX2.(TY16-18)-SBS \qquad (42)$$

Relay MFE is included in this coincidence circuit to avoid operation of the circuit during the forced release timing count. Element TX2.TY18 is of course, also marked with a 1 when the maximum number of ten digits has been dialled, the last being registered in block TY18. Relay MGE is re-set during the scan TY19 by the circuit:

$$TY19-\overline{MGE} \qquad (43)$$

*Director Call Metering*

For calls made in the local director area, metering is effected on a multi-fee basis. Pulses are applied to the subscriber's meter on completion of a connection, and in the present example, one to four pulses are applied to the meter, depending upon the distance of the wanted subscriber. Meter pulses are provided by a clock pulse generator which generates a cycle of 30 pulses, each of 100 ms. duration, and these are distributed over 30 leads, designated TM1–30. The metering code supplied by the translator, and written in block TY2 of a register, determines the number of meter pulses applicable to a call, and the timing periods represented by meter code markings in block TY2 are associated with four of the meter timing leads to enable one or more of these to be selected by the meter code marking.

The following coincidence circuits are provided:

$$TX4.TM7$$
$$TX5.(TM11+15)$$
and $$TX6.TM19$$

The first of these coincidence circuits produces an output each time an element TX4 is scanned during the 100 ms. meter pulse period TM1. Because the complete scan takes 100 ms., the scan of each TX4 element on each register track will coincide with an output pulse from this circuit once in each meter pulse cycle. The second of these circuits will produce an output as each element TX5 is scanned during the pulse periods TM11 and TM15, and the third circuit will produce an output during the scan of each element TX6 during the pulse period TM19. These circuits are combined to form an "or" circuit designated TMM, which produces an output when any of the three above-mentioned coincidences occurs. A further coincidence circuit is included in circuit TMM:

$$(TX1+2).TM1$$

and this is used to initiate and terminate the transmission of meter impulses.

The circuit will be described with reference to FIG. 8. When the called subscriber answers, a marking is sent to the common control equipment from the relay set over a lead PID, and this indication is used in a coincidence circuit to mark element TX2.TY20, to indicate that the transmission of pulses to the subscriber's meter may commence. This coincidence circuit is:

$$PID.TX2.TY20.TMM-SBS, \qquad (1)$$

and it will be seen from the description of circuit TMM given above that a 1 will be marked in element TX2.TY20 of the calling subscriber's register at some point in the pulse period TM1. This is confined to the register associated with the call in question because the signal PID is received only when the associated relay set is scanned. When the pre-read head detects this marking, a relay MAG is set by means of the circuit:

$$SLP.TX2.TY20-MAG \qquad (2)$$

The meter code markings stored in elements $$(TX4-6).TY2$$

are now scanned, and in accordance with these markings, a relay MBG is set and re-set the appropriate number of times, the output of relay MBG in the set condition being used to send an impulse to the relay set, which repeats it to the subscriber's meter. The circuit for operating relay MBG is:

$$MAG.SLS.(TX4-6).TY2.TMM-MBG \qquad (3)$$

Supposing, for example, that a connection has been set up for which three metering impulses were required. In this case, the translation would include a 1 marked in elements (TX4+5).TY2. The last-mentioned circuit would then set relay MBG during the pulse period TM7, again during pulse period TM11 and again during pulse period TM15. Relay MBG is re-set at the end of the scan of a register by the circuit:

$$TX6.TY21-\overline{MBG} \qquad (4)$$

so that in this example relay MBG would be set three times, at intervals of 400 ms., each time for approximately 1 ms. If four metering impulses were required, a 1 would be marked in each of the three elements TX4–6, while one or two metering impulses would be provided by 1 markings in elements TX4 and TX5 respectively.

When relay MBG is set, an impulse is sent to the relay set over a lead POI during the scan of block TY21, by means of the circuit:

$$PID.MBG.TY21-POI \qquad (5)$$

this signal being terminated when relay MBG is re-set during the scan of element TX6.TY21. The provision of the input signal PID is necessary in this circuit to confine its operation to the appropriate register. This is because relay MBG is set due to the setting of relay MAG during the scan by the pre-read head, during which scan the signal PID relating to the register in question is not available to restrict the setting of relay MAG to a register concerned in the connection in which the called subscriber has answered. Relay MAG is also re-set at the end of each register scan by the circuit:

$$TX1.TY20-\overline{MAG} \qquad (6)$$

but is again set when the pre-read head detects the "start of metering" marking in an element TX2.TY20, by means of the previously, mentioned circuit:

$$SLP.TX2.TY20—MAG \qquad (2)$$

The completion of metering is determined by the completion of the cycle of meter timing pulses TM1–30. An output from the coincidence circuit (TX1+2). TM1 will occur when the cycle is complete, and pulse leads TX1 and TMM are included in a circuit together with the output of relay MAG in the set condition, this circuit being used to write a 1 in the "end of metering" element TX1.TY20 when the meter pulse cycle is complete. The circuit is:

$$PID.MAG.TX1.TY20.TMM—SBS \qquad (7)$$

the signal PID being required as previously-mentioned, because the setting of relay MAG is not confined to a register requiring metering. Relay MBG is re-set during each scan of block TY20 of the register when this last-mentioned marking is detected, to prevent further impulses being sent over lead POI during subsequent scans of block TY21 as the various meter timing pulses recur. The circuit for re-setting relay MBG is:

$$SLS.TX1.TY20—\overline{MBG} \qquad (8)$$

*Transfer of Dialled Digits to Trunk-Dialling Register*

When the trunk-dialling prefix "0" is detected in the "A" digit storage block (TY9) of a director register, the appropriate routing digit is immediately written in block TY3 and the transmission of digits is commenced. It will be recalled that upon this translation being given, the circuit:

$$MEM.TX1.(TY10–18)—SBS \ (20, FIG. 5)$$

caused a 1 to be written in elements TX1 of all the digit storage block TY10–18 to enable all subsequently dialled digits to be retransmitted. The routing digit is first transmitted, and this sets the first code selector to the appropriate level to hunt for and seize a free trunk-dialling relay set, which is prepared to receive the dialled code with the exception of the prefix digit stored in block TY9 of the director register, which is no longer required. Transmission of impulses proceeds normally as previously described, the TX2 element of each digit storage block being examined in turn to ensure that the block contains a complete digit before its re-transmission is commenced.

The arrangement of storage elements in the register of a trunk-dialling drum is similar to that of the local director drum. Only five routing digits are catered for in the former, and these are allotted blocks TY4–8. Block TY3 in this register is employed to store control information supplied by the translator which determines which of the dialled digits are to be retransmitted. Because the prefix digit "0" is not registered in the trunk-dialling equipment, only nine code and numerical digit storage blocks are required, and these are allotted blocks TY9–17 block TY18 being unused. Block TY19, however is used for various control functions.

In more detail, and referring to FIG. 9, the register elements are arranged as follows. In block TY1, elements TX2 and TX3 are used in timing an inter-digital pause during transmission of digits from the register, element TX4 is used to identify a register whose stored code digits are being translated and elements TX5 and TX6 are used to detect an inter-digital pause when dialled digits are being received from a director register. The markings in block TY2 are solely concerned with metering, and are supplied by the translation part of the drum together with the routing digits. Because of the large number of different metering rates required in time metering in a national trunk network, four elements of this block are required to store the metering information, elements TX3–6 being those used.

In block TY3, element TX3 is used to store a control marking for determining whether certain of the stored digits are to be transmitted or not, while elements TX4–6 are used to store a digit referred to as the "discriminating digit" or the "discriminating code," which determines the stored digits to which this control marking refers. In block TY19, element TX1 is used to store a marking when transmission of digits has been completed, element TX2 is used to store a marking when selection of digits for transmission has been completed, element TX3 is used to store a marking to initiate this selection, and element TX6 is marked when the night rate of metering is applicable.

All the elements of block TY20 are used for timing purposes, this being necessary because the timing periods controlling the frequency of metering impulses are generally long compared with the revolution period of the drum. In block TY21, element TX1 is used to store a marking to initiate metering, element TX2 is used to store a marking indicating that translation has been completed for the register, element TX3 is used in detecting impulses transmitted from the director register, element TX4 is used in comparing the signal being received from the director register with that being received during the previous scan, and element TX5 is used to register temporarily an impulse received from the director register.

The elements not mentioned above are not used in the present circuits i.e. elements TX1.TY1, TX1.TY2, TX2.TY2, TX1.TY3, TX2.TY3, TX4.TY19, TX5.TY19, TX6.TY21 and all the elements of block TY18.

Registration of digits re-transmitted from the director register proceeds exactly as described for registration in this latter equipment.

*Translation of Trunk-Dialling Code*

Because of the variable number of exchange code digits employed in a national dialling system, it is necessary, in the embodiment of the invention being described, to wait until all possible code digits having been dialled and registered before proceeding with translation. It is, in fact, necessary to wait until the fifth dialled digit following the trunk-dialling prefix has been registered before effecting translation, because a 5-digit exchange code would be likely to contain as its initial digits exchange codes consisting of one, two or three digits, and unless the code is considered in its complete form, a false translation could be given.

It would, however, be possible as an alternative to start comparison of a dialled code with the address codes when a smaller number of code digits has been registered, by adding to the library information an indication where a small code were also a part of a larger code. The indication would be returned to the register, which would initiate translation again after a further digit had been registered, and this process would be repeated for as many additional digits as necessary until the full complement of code digits had been dialled. With such an arrangement, translation would be effected earlier where small codes were involved.

The circuit of the present embodiment will be described with reference to FIG. 10.

*Sequence 1.*—Detection of register awaiting translation, provision of identification marking, transfer of code digits to transfer track, marking library track "busy," selection of required library track.

The pre-read head is used to detect the registering of the fifth significant digit by means of the 1 marked in element TX2 of the fifth digit storage block TY13, and thereupon to set a relay MAH. Translation cannot be effected, however, while the transfer track is in use, and the transfer track is marked in the element corresponding to an element TX2.TY13 on a register track to indicate whether it is free or busy, a 1 marking indicating the busy condition. It will be recalled that the information on the transfer track is regenerated every seven TY blocks, so that the transfer track is, in effect, only seven TY blocks long. The busy marking element on the transfer track therefore corresponds with each element TX2.TY6, TX2.TY13, and TX2.TY20 in each register of a register track. Relay MAH is therefore set only when the read head of the transfer track reads a 0 during the timing period TX2.TY13 in the scan of the register in which a full complement of code digits has been received. The circuit for this is:

$$\text{SLT.SLP.TX2.TY13}-\overline{\text{MAH}} \qquad (1)$$

The 1 marking in element TX2.TY13 in the register in question will be maintained after the translation process has been completed, and relay MAH must therefore be re-set if translation has already been effected. When the translated code has been registered, a 1 is marked in element TX2.TY21 of the register, and this marking is used to re-set relay MAH in the circuit:

$$\text{SLP.TX2.TY21}-\overline{\text{MAH}} \qquad (2)$$

The pre-read head is used in these two circuits so that the translation of a stored code may be effected during the same revolution of the drum as that in which the register is found to require the services of the translator.

If relay MAH is still in the set condition when the pre-read head has scanned element TX2.TY21, a 1 is marked in the next element TX4.TY1 scanned by the normal read and write heads, which is, of course, in the register which has just been scanned by the pre-read head. The circuit is:

$$\text{MAH.TX4.TY1}-\text{SBS} \qquad (3)$$

This marking is used to identify the register to which the translated information must be returned at a later stage. A cancel signal is also provided for this storage element, but the last-mentioned circuit takes precedence while it is operative. On the next scan, when the translation process has been completed, relay MAH will be re-set, and the last-mentioned circuit will no longer be effective, so that the cancel signal, produced by the circuit:

$$\text{TY1}-\text{SAS} \qquad (16, \text{FIG. 4})$$

will clear the marking in this element.

Library information is contained on several tracks, and the first code digit is employed to select the track containing the required translation. The track is selected in the manner described for the director library tracks by a combination of four relays conveniently designated LTS, which are set by the four binary digits stored in the first code digit storage block TY9. The library track switching unit is first re-set during the scan of block TY2 by the circuit:

$$\text{MAH.TY2}-\overline{\text{LTS}} \qquad (4)$$

and is then set by the circuit:

$$\text{MAH.SLS.TY9}-\text{LTS} \qquad (5)$$

It is possible that more addresses will be required than can conveniently be stored on one address track, and in this case, several address tracks would be provided, corresponding to the library tracks, the selection of the required address track being effected by the setting of the switching unit LTS.

The B, C, D and E digits stored in the register are now transferred to the transfer track by connecting the reading head of the appropriate register track to the writing head of the transfer track via the common control equipment, the circuit used being:

$$\text{MAH.SLS.(TY10-13)}-\text{SBT} \qquad (6)$$

This circuit will transfer the 1 markings from the required register only, since relay MAH will only be set during the scan of this register. A second circuit is provided to cancel any 1 marking which may previously have been written on the transfer track. This circuit is:

$$\text{MAH.(TY10-13)}-\text{SAT} \qquad (7)$$

The markings in elements TX2 of the code digit storage blocks of the register are also written on the transfer track by the transfer circuit just mentioned, and the 1 marking of element TX2.TY13 provides a busy indication for the transfer track. When transfer of the four digits has effected, relay MAH is re-set by the circuit:

$$\text{SLT.TX2}-\overline{\text{MAH}} \qquad (8)$$

This operation occurs when the first 1 marking written on the transfer track in a TX2 element reaches the read head, after an interval equivalent to seven TY pulses, i.e. during the scanning period TX2.TY17.

It is possible that there may be several codes in a national numbering scheme which contain only one or two digits. If these were allotted to library tracks and address tracks on the basis of one track for each A digit, the tracks containing these codes would be used very uneconomically, since there would be only a few codes on each track. It would be possible in this case to use a single library or address track to cater for more than one A digit, by transferring the whole code to the transfer track, including the A digit, and by including the A digit in each address on the address track. The coincidence circuits (6) and (7) would be required to be operative during the scan of blocks TY9–13, instead of TY10–13 as previously mentioned.

It is also possible that the number of translations of codes including a particular A digit could not all be contained on one library track. The B digit would then be required to discriminate between the library tracks and, possibly, the address tracks to be scanned, and it would be necessary to use both A and B digits to control the switching unit LTS. The coincidence circuit (5) would be required to be operative during the scan of blocks TY9+10, instead of just TY9 as previously described.

Sequence 2.—Start of search for address at beginning of address track, detection of required address, transfer of translation of code to the transfer track.

The code written on the transfer track is now compared in turn with each of the addresses permanently stored on the address track or the selected address track until an address is located which is identical with the code. Because of the different possible numbers of code digits which may be required, it is necessary to search for 4-digit addresses first, and then in turn for addresses containing a smaller number of digits. The addresses are written on the address track or tracks in a definite order, commencing with 4-digit addresses and finishing with 1-digit addresses. It is therefore essential to ensure that the search for an address is always started at the same point on the track. A relay MBH is set as this starting point of the address track is scanned, if the transfer track has a "busy" marking written in an element corresponding to the timing pulse TX2.TY13. The circuit is:

$$\text{SLT.TX2.TY13.TZ1}-\text{MBH} \qquad (9)$$

The address track, as described in connection with the director translator, is divided into sections equivalent in length to seven TY blocks, and the address digits are stored in the last four TY blocks of each address section. An address, therefore is stored in the equivalent of blocks TY3–6.TY10–13 and TY17–20. A relay MCH is set at the beginning of the scan of each address section if relay MBH is also set, and relay MCH is therefore not set until the beginning of the scan of the address track. The setting circuit for relay MCH is:

$$\text{MBH.TX6.TY2+9+16)}-\text{MCH} \qquad (10)$$

The set condition of relay MCH may now be used to detect coincidence of codes on the transfer track with codes on the address track, as the codes are circulated. Relay MCH is re-set if the information on the transfer track differs from the information in corresponding elements on the address track. The comparison circuits are:

$$\text{SLT.}\overline{\text{SLB}}\text{.TYB}-\overline{\text{MCH}} \qquad (11)$$

and $$\overline{SLT}.SLB.TYB—\overline{MCH} \qquad (12)$$

In these circuits, SLB and $\overline{SLB}$ represent signals from the read head of the address track, and TYB is a combined timing pulse covering the scan of the address sections of the address track. It may be represented as:

$$TY3-6+10-13+17-20)$$

Each address code on the address track is followed by a 1 marking in element TX1 of the storage block following that in which the last digit of the address is stored, so that the number of digits in the address can be determined. If relay MCH is still in the set condition when a marked TX1 element is scanned on the address track, this may be regarded as an indication that the correct address has been located, and a relay MDH is thereupon set by the circuit:

$$MCH.SLB.TX1—MDH \qquad (13)$$

When the required address has been reached, relay MCH is re-set by the 1 marking in the element TX1 by means of the previously-mentioned circuit:

$$\overline{SLT}.SLB.TYB—\overline{MCH} \qquad (12)$$

and the set condition of relay MDH is used to re-set relay MBH at the beginning of the scan of the next address section by means of the circuit:

$$MDH.TX6.(TY1+8+15)—\overline{MBH} \qquad (14)$$

If the required address has not been found at the end of an address section, relay MCH is again set by means of the circuit:

$$MBH.TX6.(TY2+9+16)—MCH \qquad (10)$$

and the comparison process continues until coincidence occurs between signals on the two tracks.

When the correct address has been found, the corresponding translation may be written on the transfer track from the selected library track, but the existing code digits must also be removed from the transfer track. The transfer track is cleared as the translation is being written, the relays MDH and MBH being used in a circuit which tends to write 0 in each element of the transfer track. The outputs of these two relays are used in a second coincidence circuit, together with the output of the reading head of the selected library track, to write 1's in the appropriate elements of the transfer track, as these markings are read from the library track. These two circuits are:

$$MDH.\overline{MBH}—SAT \qquad (15)$$

and $$MDH.\overline{MBH}.SLL—SBT \qquad (16)$$

The library tracks are arranged in the same manner as that described for the director translator. The translations, which contain metering and digit transmission control information in addition to routing digits are located in sections, equal in length to the address sections, i.e. the equivalent of seven TY blocks, but the translation is stored one section behind the corresponding address, so that when coincidence between a code being circulated on the transfer track and an address has been found, the translation next scanned will be the one required.

When the end of the translation section has been reached, relay MDH is re-set, and this confines the transfer of information between the libarary and the transfer track to the required section. The circuit for re-setting relay MDH is:

$$\overline{MBH}.TX6.(TY1+8+15)—\overline{MDH} \qquad (17)$$

*Sequence 3.*—Detection of originating register, transfer of translation to register, provision of operator code if unused code is dialled, release of transfer track.

The translated code is now circulated on the transfer track until the originating register is reached. It will be recalled that this register was marked by writing a 1 in element TX4.TY1, and the two relays MEH and MFH are set when this marking is detected, by means of the circuit:

$$SLS.TX4.TY1—MEH \text{ and } MFH \qquad (18)$$

The transfer of the meter code, digit transmission control information and routing digits from the transfer track to the register is initiated by the setting of relay MEH. The required storage blocks TY2–8 in the register are cleared at the same time as the various parts of the translation read from the transfer track are written into the corresponding stores, the two circuits being:

$$MEH.(TY2-8)—SAT \qquad (19)$$

and $$MEH.SLT.(TY2-8)—SBS \qquad (20)$$

The address track includes unused as well as used codes, the translation corresponding to unused codes providing a routing to a manual board. On the library track these unused routing codes are identified by a 1 marked in element TX1.TY3 or TX1.TY10 or TX1.TY17, depending on the position of the code on the library track. When the code is written on the transfer track, the 1 marking will appear in element TX1.TY3 and the binary digit stored in this element is used to control relay MFH. If a 0 is written in element TX1.TY3 a used code is indicated, and relay MFH is re-set by the circuit:

$$SLT.MEH.TX1.TY3—\overline{MFH} \qquad (21)$$

If the code is unused, relay MFH is not re-set by the marking in this element of the transfer track, and the set condition of this relay is used to write 1 in the TX2 element of the numerical digit storage blocks TY14–17 to prevent registration of further impulses. The circuit is:

$$MFH.TX2.(TY9-17)—SBS \qquad (22)$$

blocks TY9–13 being covered in addition for convenience in the use of timing leads.

When the routing code is being circulated on the transfer track, it is necessary to prevent the comparison circuits being taken into use, because the routing code might coincide in part with an address written on the address track. To avoid this, each code written on a library track is preceded by a 1 marked in element TX1.TY2 or TX1.TY9 or TX1.TY16 as the case may be, and when the routing code is transferred to the transfer track, the presence of this marking ensures that no coincidence can occur with an address, since no such marking appears on the address track. Thus relay MCH cannot be re-set by a coincidence being registered, and relay MDH which, it will be recalled, is used in transferring a translation of the transfer track, cannot be set.

When all the translation information has been returned to the originating register, a 1 is written in element TX2.TY21 of the register to indicate that translation is complete. Since relay MEH is set at the beginning of the scan of the register during which the transfer is made, it may conveniently be used to write in the marking indicating the completion of translation, and the circuit used is:

$$MEH.TX2.TY21—SBS \qquad (23)$$

This marking re-sets relay MAH on the following scans by the pre-read head, to prevent further translations being made.

The transfer track is still marked busy, and relay MBH would again be set when the marking indicating the beginning of the address track is detected. A re-set signal for relay MBH must therefore be provided to prevent relay MCH being set again, and the set condition of relay MEH is used to re-set relay MBH in the circuit:

$$MEH—\overline{MBH} \qquad (24)$$

Relay MEH and, if necessary, MFH, are re-set towards the end of the scan of the register by the circuit:

$$TX2.TY21—\underline{MEH}.\underline{MFH} \qquad (25)$$

*Selection of Digits for Transmission From Trunk-Dialling Equipment*

For a call over a national dialling network, it may be necessary to re-transmit some or all of the dialled exchange code digits, together with the routing digits supplied by the translator digits and the dialled numerical digits, or it may be that the routing and numerical digits alone are sufficient. It is also possible, for example in the case of a call to a manual exchange, that no numerical digits need be re-transmitted. The translation of the dialled code, obtained from the library tracks, includes a discriminating code which determines which digits are to be transmitted. The code is in two parts, the first being a control marking, which may be either 0 or 1, marked in element TX3.TY3, and the second is a numerical code stored in binary form in the three elements (TX4–6).TY3. When it is required to retransmit some or all of the exchange code, without the numerical digits, a 0 is written in the control element TX3.TY3, and when this marking is detected, the discriminating numerical code is used to determine the number of dialled digits to be re-transmitted, commencing with the first exchange code digit. In the case where the routing and numerical digits alone are required for routing the call, or where not all the exchange code digits are required, a 1 is marked in the control element TX3.TY3, and in this case the discriminating numerical code is used to determine which of the dialled impulses must not be transmitted, again commencing with the first exchange code digit.

As previously explained for the director register, when a digit is to be transmitted, element TX1 in the appropriate digit storage block is marked with a 1 before transmission commences. The discriminating numerical code stored in element (TX4–6).TY3 is reduced by one on each scan of the register by the common equipment, until the code is reduced to zero, and as each subtraction is made, a 1 or 0 is written into successive TX1 elements of storage blocks, TY9–17, depending on the marking in element TX3.TY3. The circuit will be described with reference to FIG. 11.

*Sequence 1.*—Detection of transmission control marking 1, marking 1 in all "outgoing busy" elements, provision of discrimination start marking.

When a 1 marking has been written in element TX2.TY21, indicating that a routing code has been returned to the register from the translator, relays MAC and MBC are set during the scan by the pre-read head by means of the circuit:

$$\underline{MDC}.SLP.TX2.TY21—MAC \text{ and } MBC \qquad (1)$$

The condition of relay MBC is thereafter used as an indication of the marking written in element TX3.TY3. If a 1 is written there, relay MBC is re-set by the circuit:

$$SLS.TX3.TY3—\underline{MBC} \qquad (2)$$

This circuit is inoperative if a 0 is written in element TX3.TY3 of a register, and relay MBC remains set. Relay MAC, however, remains in the set condition if a 1 is written in element TX3.TY3, and its output is used in a circuit which writes a 1 in the TX1 elements of all the digit storage blocks TY9–17, the circuit being:

$$MAC.\underline{MCC}.TX1.(TY9–17)—SBS \qquad (3)$$

The set condition of relay MAC is also used to write 1 in element TX3.TY19, to initiate the discrimination of digits to be transmitted. The circuit is:

$$MAC.TX3.TY19—SBS \qquad (4)$$

A circuit is provided for re-setting the relays MAC and MBC at the end of the scan of the register if either of these relays has remained in the set condition until that point. This circuit is:

$$TX1.TY21—\underline{MAC} \text{ and } \underline{MBC} \qquad (5)$$

*Sequence 2.*—Detection of marking initiating discrimination, counting down discriminating digit, cancellation of 1 markings in appropriate "outgoing busy" elements, provision of "discrimination complete" marker when discriminating digit is reduced to zero.

A relay MCC is set when the pre-read head detects the 1 marking in element TX3.TY19, indicating that selection of digits for transmission may be started. The circuit employed is:

$$SLP.TX3.TY19—MCC \qquad (6)$$

With relay MCC in the set condition, the process of subtraction from the discriminating numerical digit stored in elements (TX4–6)TY3 is commenced by means of the circuits:

$$MCC.\underline{MDC}.(TX4–6).TY3—SAS \qquad (7)$$
$$MCC.\underline{MDC}.\underline{SLS}.(TX4–6).TY3—SBS \qquad (8)$$
and $$MCC.SLS.(TX4–6).TY3—MDC \qquad (9)$$

It will be recalled that the rule for subtracting one from a number in binary form is to change all 0's to 1's and all 1's to 0's, commencing with the lowest order, until a 1 has been changed to a 0. The first of the three last-mentioned circuits attempts to change 1's to 0's, while the second changes 0's to 1's. The third circuit, however, causes relay MDC to be set when a 1 is detected in one of the storage elements, and the first two circuits are thereby rendered inoperative, at the same time as the 1 which caused relay MDC to be set is changed to 0.

When relay MDC has been set, its output is used, together with that of relay MAC, to cancel the 1 marking in element TX1 of the first digit storage block in the group TY9–17 by means of the circuit:

$$MAC.MDC.SLS.TX1.(TY9–17)—\underline{SAS} \qquad (10)$$

To prevent further markings in elements TX1 of these storage blocks being cancelled in the same scan, relay MAC is re-set by this last-mentioned circuit when the first 1 marking is encountered in an element TX1 in the group of blocks TY9–17:

$$MAC.MDC.SLS.TX1.(TY9–17)—\underline{MAC} \qquad (10)$$

and this makes the circuit ineffective for the scan of the following digit storage block.

This process is continued on consecutive scans by the common equipment, i.e. at intervals of 100 ms., the 1 marking being cancelled in the TX1 element of one TY block on each scan, until the discriminating digit in block TY3 has been reduced to 0. This condition is detected by relay MAC being in the set condition and MDC in the re-set condition after block TY3 has been scanned. When this occurs, a marking indicating that discrimination is complete is made by writing a 1 in element TX2.TY19 by means of the circuit:

$$MCC.MAC.TX2.TY19—SBS \qquad (11)$$

relay MCC being re-set at the same instant by the circuit:

$$TX2.TY19—\underline{MCC} \qquad (12)$$

Relays MAC, MBC and MCC are all re-set at this stage, relay MDC being re-set during the scan of element TX1.TY19 by the circuit:

$$TX1.TY19—\underline{MDC} \qquad (13)$$

Relay MCC is re-set during the scan of element TX1.TY21 by the circuit:

$$TX1.TY21—\underline{MAC} \text{ and } \underline{MBC} \qquad (5)$$

To prevent further setting of relays MAC and MBC if discrimination has been completed, relay MDC is set if, during the scan by the pre-read head, a 1 marking is detected in element TX2.TY19 by means of the circuit:

SLP.TX2.TY19—MDC   (14)

and this renders the setting circuits of relays MAC and MBC inoperative. It will be recalled that relay MDC is re-set during each scan of element TX1.TY19, and thus, after discrimination is complete, relay MDC remains in the set condition throughout the scan of the register, preventing further operation of the discriminating circuits.

When the transmission of digits from the register is in progress, after the transmission of the routing digits supplied by the translator, only these digits stored in TY blocks in which the elements TX1 retain a 1 marking will be transmitted. These will normally be the numerical digits only, and this method of preventing transmission of the exchange code digits is necessary because it is only by reference to the translator that the register can discriminate between exchange code and numerical digits, due to the variable number of code digits required in trunk-dialling calls.

Sequence 3.—Detection of 0 marked in transmission control element, provision of marking to initiate discrimination.

In the case where the control element TX3.TY3 is marked with a 0, relays MAC and MBC are again set on the detection by the pre-read head of a 1 marking in element TX2.TY21 by the previously-mentioned circuit:

MDC.SLP.TX2.TY21—MAC and MBC   (1)

Relay MAC is, however, re-set when the 0 marking in element TX3.TY3 is detected, by the circuit:

SLS.TX3.TY3—MAC   (15)

leaving relay MBC in the set condition. This prevents operation of the circuit previously described for marking the TX1 elements of the dialled digits storage blocks:

MAC.MCC.TX1.(TY9–17)—SBS   (3)

When relay MBC is in the set condition during the scan of blocks TY9–17, a 1 is marked in the TX2 elements of these blocks to prevent the registration of further dialled digits, which are not required to be re-transmitted. The discrimination initiating marking is then written in element TX3.TY19 due to the set condition of relay MBC in the circuit:

MBC.TX3.TY19—SBS   (16)

At the end of the scan of the register, relay MBC is re-set by the previously-mentioned circuit:

TX1.TY21—MAC and MBC   (5)

Sequence 4.—Detection of start of discrimination marking, counting down discriminating digit, marking 1 in appropriate "outgoing busy" elements, provision of markings to indicate completion of discrimination.

When the pre-read head detects the 1 marking which is written in element TX3.TY19, relay MCC is set, and subtraction from the discriminating digit stored in block TY3 is initiated as previously explained, the operation of the circuits:

SLP.TX3.TY19—MCC   (6)
MCC.MDC.(TX4–6).TY3—SAS   (7)
MCC.MDC.SLS.(TX4–6).TY3—SBS   (8)
and   MCC.SLS.(TX4–6).TY3—MDC   (9)

occurring as already described. On each occasion that relays MDC and MBC are both in the set condition, i.e. once in each scan of the register, a 1 is marked in the TX1 element of one of the storage blocks TY9–17 in which a 0 was previously written, by means of the circuit:

MBC.MDC.SLS.TX1.(TY9–17)—SBS   (17)

these storage blocks being marked in this manner in turn as the discriminating digit stored in block TY3 is successively reduced. To prevent more than one such marking being written during any one scan, relay MBC is re-set by this last-mentioned circuit:

MBC.MDC.SLS.TX1.(TY9–17)—MBC   (17)

and this renders the circuit inoperative as the next storage block is scanned.

If relays MBC and MCC remain in the set condition after the scan of block TY17, indicating that the discrimination digit stored in block TY3 has been reduced to zero, a 1 is marked in element TX2.TY19 to indicate that discrimination is complete, the circuit being:

MBC.MCC.TX2.TY19—SBS   (18)

Only those digits are now transmitted which are stored in blocks which have been marked with a 1 in their TX1 elements during the counting down of the discriminating digit.

In case the subscriber has dialled further unnecessary digits which would be stored in the numerical digit storage blocks, a clearing signal is applied to the last three of these, TY15–17, to enable the impulse transmission circuit to determine when transmission of digits has been completed. Relay MBC is used in this circuit, which is:

MBC.(TY15–17)—SAS   (19)

relay MBC in its set condition indicating the presence of a 0 in the discriminating control element TX3.TY3.

At this stage relays MAC, MBC, MCC and MDC are re-set. Relay MDC is re-set on the scan of element TX1.TY19, relay MCC is re-set on the scan of element TX2.TY19 and relays MAC and MBC are re-set on the scan of element TX1.TY21, the circuits being:

TX1.TY19—MDC   (13)
TX2.TY19—MCC   (12)
and   TX1.TY21—MAC and MBC   (5)

*Transmission of Digits From Trunk-Dialling Register*

The translated code digits include a 1 marking in their TX1 elements, and transmission of digits is initiated as soon as the first of these markings is detected in the register. Transmission of digits is effected by circuitry similar to that described for the director register, the interdigital pause being timed in the same manner as for that circuit, and the end of reception of digits from the director relay set being determined by the use of a four second timing circuit.

The facility of restraining transmission of the penultimate numerical digit until the last numerical digit has been registered is provided, to cater for calls to large P.A.B.X. groups, and this also requires the use of a four second timing circuit, because of the variable number of dialled digits involved in a trunk-dialling call. The additional circuit is shown in FIG. 11a. To determine which digit is the last it is necessary to allow the four second timing period to elapse, and the seventh, eighth and ninth digits received by the trunk-dialling register are restrained until the end of the timing count is indicated, as described for the director register, by the 1 marking being written in this case, in element TX2.TY17. A relay MHE is set when a 0 is detected by the pre-read head in this element, by means of the circuit:

SLP.TX2.TY17—MHE   (1)

The setting of relay MHE causes a relay MDE to be set at the beginning of the scan of the seventh digit storage block. The circuit is:

MHE.TY15—MDE   (2)

The circuit:

MCE.MDE.TX2—MAE   (28, FIG. 7)

now re-sets relay MAE, whose function was previously described, to prevent the transmission of further impulses. Relay MHE is re-set after it has been used to set relay MDE, by means of the circuit:

TY15—MHE   (3)

and the delay in re-transmitting these numerical digits continues until the timing count is completed, when a 1 is written in element TX2.TY17, indicating that the last dialled digit has been received.

*Metering a Trunk-Dialling Call*

Metering for a call over the national dialling network is effected on a time and distance basis. A meter pulse generator is employed which provides pulses of 100 ms. duration successively on the 30 leads TM1–30 in a continuous cycle, as described in connection with the forced release circuit. Certain of these leads are selected to provide timing pulses which are counted in the meter fee storage block TY20, and the rate at which this block is filled determines the rate at which the subscriber's meter receives impulses during the call. The required meter clock pulses are selected, as previously described, by means of coincidence circuits which each include one TX pulse lead and one or more meter clock pulse leads, arranged as follows:

TX3.(TM28–30+1–7)
TX4.(TM3–17)
TX5.(TM22–25)
TX6.(TM18–24)

These four circuits are further combined in an "or" circuit designated TMT, such that a coincidence in any of the four circuits produces an output on a lead TMT.

The rate of impulsing to a subscriber's meter varies not only with the distance of the call, but also according to whether the call is from an ordinary subscriber or a coin-box subscriber, and whether the call is made during the day or at night. The following table shows the frequency of impulsing a subscriber's meter under the various conditions mentioned, the elements tabulated in the column "Meter fee code dight" being those in which a 1 is marked when the translator returns a metering code to the register in accordance with the translation of the code digits dialled.

| Meter fee code digit | Day | | Night | |
|---|---|---|---|---|
| | Ord, seconds | CCB, seconds | Ord, seconds | CCB, seconds |
| TY2 | 6 | 4 | 12 | 8 |
| TY2.TX3 | 9 | 6 | 18 | 12 |
| TY2.TX4 | 12 | 8 | 24 | 16 |
| TY2.(TX3+4) | 18 | 12 | 36 | 24 |
| TY2.(TX3+4+5) | 30 | 20 | 60 | 40 |
| TY2.(TX3+4+6) | 60 | 40 | 120 | 80 |
| TY2.(TX3+4+5+6) | 90 | 60 | 180 | 120 |

In this table, "Ord" indicates an ordinary subscriber, and "CCB" indicates a coin box subscriber.

The metering circuit will be described with reference to FIG. 12.

*Sequence 1.*—Detection of cleared condition of timing block, provision of initial digit in timing block, provision of indication of called subscriber answering, transmission of initial metering impulse.

When the called subscriber answers, the relay set provides a marking on a lead PID which sets relay MAK during the scan of element TX6.TY19 by means of the circuit:

PID.TX6.TY19—MAK            (1)

If a digit is stored in the block TY20, which is used for the metering timing count, relay MAK is immediately re-set by means of the circuit:

SLP.TY20—M̄ĀK̄            (2)

but if the block has no digit stored in it, relay MAK remains in the set condition. If the call is being made by a coin box subscriber, a signal is received over a lead PCB from the relay set, and during the scan of block TY19, the receipt of such a signal sets a relay MFK by means of the circuit:

PCB.TY19—MFK            (3)

If relay MAK is still set on the next scan of block TY19, indicating that no digit is stored in block TY20, relay MBK is set by means of the circuit:

MAK.TY19—MBK            (4)

The set condition of this relay causes the digit "4" to be stored in block TY20 if the call is from an ordinary subscriber, i.e. if relay MFK is in the re-set condition, and "24" to be registered in block TY20 if relay MFK is in the set condition, indicating a call from a coin box subscriber, the two circuits being:

MBK.M̄F̄K̄.TX3.TY20—SBS            (5)

and

MBK.MFK.(TX4+5).TY20—SBS            (6)

It will be seen that the initial digit stored in this block determines the time taken to complete the full count, and because the subscriber's meter is operated each time the full complement of binary digits is stored in block TY20, this initial digit also determines the rate of applying impulses to subscriber's meter. All six elements of block TY20 are used for the timing count, so that the full complement of digits is 63.

With relay MBK in the set condition, the metering cycle may be commenced, and a 1 is first written in element TX1.TY21 by means of the circuit:

MBK.TX1.TY21—SBS            (7)

The first meter pulse is transmitted to the relay set via a lead POI immediately the called subscriber answers, this being indicated by the set condition of relay MBK. The circuit used is:

MBK.M̄Ē̄K̄.—POI            (8)

The output from the relay MEK in its re-set condition is included to prevent operation of this circuit when the night metering rate is applicable. When the end of the scan of the register is reached, relays MBK and MFK are re-set by the circuit:

TX6.TY21—M̄B̄K̄ and M̄F̄K̄            (9)

*Sequence 2.*—Detection of marking initiating metering, addition to meter timing count, transmission of further meter pulses to relay set.

A relay MCK is now set when the pre-read head detects the presence of a 1 in element TX1.TY21 indicating that meter pulse timing may be initiated, the circuit being:

SLP.TX1.TY21—MCK            (10)

The set condition of relay MCK is used to add 1 to the digit stored in the meter timing store TY20, but this will not be required on every scan of the register by the common equipment, and is dependent on the meter digit stored in block TY2. Relay MCK is, in fact, re-set before it can be effective in adding to the meter timing count if on any particular scan an output appears on lead TMT during the scan of block TY2. The circuit for this is:

SLS.(TX3–6).TY2.TMT—M̄C̄K̄            (11)

An output will only occur on lead TMT during the scan of this block in those pulse periods represented by the digit markings stored in the block. On any particular scan of block TY20, therefore, relay MCK will be set or It will be recalled that the rule for adding 1 to a digit re-set depending on the meter code stored in block TY2. stored in binary form is to change 0's to 1's and 1's to 0's starting with the lowest order, until a 0 has been changed to a 1, and this is effected in the meter timing block TY20 by the circuits:

MCK.TY20—SAS            (12)

MCK.S̄L̄S̄.TY20—SBS            (13)

and
$$\text{SLS.TY20} \longrightarrow \overline{\text{MCK}} \qquad (14)$$

The first of these circuits attempts to write 0 in each element of the block, while the second writes 1 where 0 was previously stored. The third circuit re-sets relay MCK when a 0 is detected, i.e. at the same instant as the 0 is changed to a 1. Relay MCK is also re-set if metering has not commenced on the following register, this condition being indicated by the presence of a 0 in element TX1.TY21 of that register. The circuit for resetting relay MCK is:
$$\text{SLP.TX1.TY21} \longrightarrow \overline{\text{MCK}} \qquad (15)$$

One is added to the timing count in block TY20 on subsequent scans in accordance with the meter code stored in block TY2, until the full complement of digits (63) is stored. The next one added to this count then changes all the binary digits stored from 1 to 0, and block TY20 becomes empty. After relay MAK has been set during the scan of element TX6.TY19 following this, it remains set because no 1's are encountered during the scan of block TY20 by the pre-read head. Relay MBK is set during the following scan, and the appropriate initial digit "4" or "24" is written in element TY20 as before. At the same time an impulse is transmitted over lead POI to the relay set to operate the subscriber's meter, as previously described. The process is repeated until the connection is released.

An example will now be given to show how the rate of impulsing a subscriber's meter is determined by the meter code digit stored in block TY2 of the register. Consider the case of a coin box subscriber making a call which requires his meter to be operated at intervals of 20 seconds. In this case the meter code digit stored in block TY2 would comprise 1 markings in elements TX3+4+5. At the beginning of the meter timing operation, "24" would be stored in block TY20, i.e. a further 39 binary digits must be added to complete the count, and 40 must be added to restore the block to its cleared condition, when an impulse is transmitted to the subscriber's meter.

It will be recalled that one is added to the meter timing count on each scan of block TY20 during which relay MCK is in the set condition, i.e. during those scans in which no output is obtained from the coincidence circuit:
$$\text{SLS.(TX3-6).TY2.TMT}$$

In the case under consideration, the operative coincidences in the circuit TMT are:
$$\text{TX3.(TM28-30+1-7)}$$
$$\text{TX4.(TM3-17)}$$
and $\quad$ $\text{TX5.(TM22-25)}$ because of the 1 markings in elements TX3, TX4 and TX5 of block TY2. The timing pulses during which no output will occur on lead TMT are, therefore, TM18–21 and TM26–27, a total of six pulses each of 100 ms. duration, so that on six scans of the register during each complete meter pulse timing cycle, relay MCK will not be re-set as block TY20 is scanned. The meter timing cycle lasts for three seconds, and it will be seen that six is added to the timing count in block TY20 every three seconds. The 40 binary digits required to restore the count in block TY20 to zero, in the case under consideration, will therefore be added in 20 seconds, which is the required repetition rate of metering pulses.

*Sequence 3.—Night rate metering.*

The night metering rate is half the day metering rate, and the change from one rate to the other is controlled by a key operation. It will be recalled that MAK is set when the called subscriber answers, and remains set during the complete scan of the register only if no binary digits are stored in block TY20. With relay MAK set, a 1 is marked in element TX6.TY19 if a 0 was previously stored there, by means of the circuit:
$$(16)$$

On the next occasion the timing count in block TY20 is restored to zero, if the night metering rate key KCN is thrown, the 1 marked in element TX6.TY19 is used to set relay MEK, and at the same time the 1 marking is change to 0, by means of the circuits:
$$\text{KCN.MAK.SLS.TX6.TY19} \longrightarrow \text{MEK} \qquad (17)$$
and $\quad$ $\text{KCN.MAK.SLS.TX6.TY19} \longrightarrow \overline{\text{SAS}} \qquad (17)$ It was mentioned earlier that the re-set condition of relay MEG was necessary for transmitting a meter impulse to the relay set by the circuit:
$$\text{MBK.}\overline{\text{MEK}} \longrightarrow \text{POI} \qquad (8)$$

so that with this relay in the set condition, no meter impulse will be sent to the relay set. Relay MEK is re-set at the end of the scan of the register by the circuit:
$$\text{TX6.TY21} \longrightarrow \overline{\text{MEK}} \qquad (18)$$

and when next the meter timing clock TY20 is cleared, a metering impulse will be sent to the relay set. The marking of element TX6.TY19 only on alternate occurrences of the cleared condition of block TY20 thus reduces the meter impulse rate to half that obtaining for day metering.

We claim:

1. In a telephone system, a registering and translating device comprising a magnetic drum, a plurality of circumferential tracks on said drum, a plurality of groups of storage blocks on each track, means responsive to the reception by said device of trains of impulses representing the exchange code and numerical digits of a called subscriber for registering said digits in storage blocks of one of said groups of storage blocks, means for translating said exchange code digits into routing digits and a discriminating code, means registering said routing digits and said discriminating code in further storage blocks of said one group, means for re-transmitting the digits registered in said storage blocks and means for determining in accordance with said discriminating code which of said digit are to be re-transmitted.

2. In a telephone system, a registering and translating device comprising a magnetic drum, a plurality of circumferential tracks on said drum, a plurality of groups of storage blocks on each track, means for scanning said storage blocks successively, means responsive to the reception by said device of trains of impulses representing the exchange code and numerical digits of a called subscriber for registering said digits in storage blocks of one of said groups of storage blocks, means for translating said exchange code digits into routing digits and a discriminating digit, means for registering said routing digits and said discriminating digit in further storage blocks of said one group, means for inserting a marking in each storage block in which a digit is registered, said marking indicating that the digit is subsequently to be re-transmitted, means effective on each scan of said storage blocks for changing the value of the discriminating digit by one until a predetermined value is attained, means responsive to successive changes in the value of said discriminating digit for cancelling said marking in successive storage blocks and means for re-transmitting only those digits registered in storage blocks from which the marking has not been cancelled.

3. In a telephone system, a registering and translating device comprising a magnetic drum, a plurality of circumferential tracks on said drum, a plurality of groups of storage blocks on each track, means for scanning said storage blocks successively, means responsive to the reception by said device of trains of impulses representing the exchange code and numerical digits of a called subscriber for registering said digits in storage blocks of one of said groups of storage blocks, means for translating said exchange code digits into routing digits and a discriminating digit, means for registering said routing digits and said discrminating digit in further storage blocks of said one group, means effective on each scan of said storage blocks for changing the value of the discriminating digit by one until a predetermined value is attained, means responsive to successive changes in the value of said discriminating digit for inserting a marking in successive storage blocks in which digits are registered and means for retransmitting the digits in the storage blocks into which a marking has been inserted.

4. In a telephone system, a registering and translating device comprising a magnetic drum, a plurality of circumferential tracks on said drum, a plurality of groups of storage blocks on each track, means for scanning said storage blocks successively, means responsive to the reception by said device of trains of impulses representing the exchange code and numerical digits of a called subscriber for registering said digits in storage blocks of one of said groups of storage blocks, means for translating said exchange code digits into routing digits and a discriminating code consisting of a control marking and a discriminating digit, means for registering said routing digits in further storage blocks of said one group and said control marking and discriminating digit in another storage block of said one group, means effective on each scan of said storage blocks for changing the value of the discriminating digit by one until a predetermined value is attained, means responsive to the registration of one control marking for inserting a busy marking in each storage block in which a digit is registered, said busy marking indicating that the registered digit is to be subsequently re-transmitted, means responsive to successive changes in the value of said discriminating digit for cancelling said busy marking in successive storage blocks, means responsive to the registration of a different control marking for preventing the insertion of the busy marking in each storage block in which a digit is registered, means responsive to successive changes in the value of said discriminating digit for inserting a busy marking in successive storage blocks and means for re-transmitting only those digits registered in storage blocks containing busy markings.

5. In a telephone system, a registering and translating device comprising a magnetic drum, a plurality of first circumferential tracks on said drum, a plurality of groups of storage blocks on each track, means responsive to the reception by said device of trains of impulses representing the exchange code and numerical digits of a called subscriber for registering said digits in storage blocks of one of said groups of storage blocks, a plurality of second circumferential tracks on said drum, said second circumferential tracks bearing permanent registrations representing translations of exchange code digits and a further registration, a transfer track on said drum, means responsive to the registration of exchange code digits in storage blocks of one group of storage blocks for transferring the permanent and further registrations relevant to the exchange code digits from one of said second circumferential tracks to said transfer track prior to transferring the permanent registration to further storage blocks of said one group of storage blocks, a counting device and means responsive to the transfer of said further registration to said transfer for operating said counting device.

6. In a telephone system, a registering and translating device comprising a magnetic drum, a plurality of first circumferential tracks on said drum, a plurality of groups of first storage blocks on each of said first circumferential tracks, means responsive to the reception by said device of trains of impulses representing the exchange code and numerical digits of a called subscriber for registering said digits in storage blocks of one of said groups of first storage blocks, means responsive to the reception by said device of trains of impulses representing digits of which at least one is a code digit for registering said digits in storage blocks of one of said groups of first storage blocks, a plurality of second circumferential tracks on said drum, a plurality of groups of second storage blocks on each of said second circumferential tracks, said groups of second storage blocks bearing permanent registrations representing routing digits relevant to the exchange code digits, means responsive to the registration of exchange code digits in said one group of first storage blocks for transferring the corresponding routing digits to further storage blocks in said one group of first storage blocks and means responsive to the registration of a code other than an exchange code and including at least one digit in storage blocks of said one group of first storage blocks for registering a routing digit code directly in a storage block of said one group of first storage blocks without reference to the permanent registrations in said groups of second storage blocks.

7. In a telephone system as claimed in claim 6, common equipment, means for causing said common equipment to scan the storage blocks of said groups of first storage blocks, a relay device in said common equipment, means responsive to the detection of said code other than an exchange code registered in a storage block of one of said groups of first storage blocks for operating said relay and means responsive to the operation of said relay for registering a routing digit in another storage block of said one group of storage blocks.

References Cited in the file of this patent

UNITED STATES PATENTS

| | | |
|---|---|---|
| 2,025,880 | McDavitt | Dec. 31, 1935 |
| 2,570,238 | Horwitz | Oct. 9, 1951 |
| 2,594,495 | Retallack | Apr. 29, 1952 |
| 2,694,752 | Wright et al. | Nov. 16, 1954 |
| 2,721,898 | Lomax | Oct. 25, 1955 |
| 2,723,311 | Malthaner | Nov. 8, 1955 |
| 2,767,246 | Retallack | Oct. 16, 1956 |
| 2,782,256 | Malthaner | Feb. 19, 1957 |
| 2,850,571 | Bray et al. | Sept. 2, 1958 |
| 2,851,534 | Bray et al. | Sept. 9, 1958 |